United States Patent
Cho et al.

(10) Patent No.: US 9,353,224 B2
(45) Date of Patent: May 31, 2016

(54) POLY(IMIDE-AMIDE) COPOLYMER AND COMPOSITION INCLUDING POLY(IMIDE-AMIDE) COPOLYMER

(71) Applicant: SAMSUNG ELECTRONICS CO., LTD., Suwon-si, Gyeonggi-do (KR)

(72) Inventors: Chung Kun Cho, Suwon-si (KR);
Fedosya Kalinina, Hwaseong-si (KR);
Dmitry Kravchuk, Hwaseong-si (KR);
Dmitry Androsov, Suwon-si (KR);
Mikhail Kovalev, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/088,881

(22) Filed: Nov. 25, 2013

(65) Prior Publication Data

US 2015/0057426 A1   Feb. 26, 2015

(30) Foreign Application Priority Data

Aug. 26, 2013   (KR) .................. 10-2013-0101147

(51) Int. Cl.
*C08G 73/14* (2006.01)
*C08G 73/10* (2006.01)
*C08L 79/08* (2006.01)

(52) U.S. Cl.
CPC ............ *C08G 73/14* (2013.01); *C08G 73/1039* (2013.01); *C08G 73/1064* (2013.01); *C08L 79/08* (2013.01)

(58) Field of Classification Search
None
See application file for complete search history.

(56) References Cited

U.S. PATENT DOCUMENTS

| | | | |
|---|---|---|---|
| 4,603,061 A | 7/1986 | St. Clair et al. | |
| 4,725,642 A | 2/1988 | Gannett et al. | |
| 5,019,642 A | 5/1991 | Hashimoto | |
| 5,756,650 A | 5/1998 | Kawamonzen et al. | |
| 5,952,908 A | 9/1999 | Kubo | |
| 6,088,760 A | 7/2000 | Walker et al. | |
| 7,416,695 B2 | 8/2008 | Kaneshiro et al. | |
| 7,579,054 B2 | 8/2009 | Akiyoshi et al. | |
| 8,053,331 B2 | 11/2011 | Gadkaree | |
| 9,018,343 B2 | 4/2015 | Park et al. | |
| 2011/0070461 A1 | 3/2011 | Yamada et al. | |
| 2012/0296050 A1 | 11/2012 | Cho et al. | |
| 2014/0243482 A1 | 8/2014 | Park et al. | |
| 2014/0243782 A1 | 8/2014 | Huwiler et al. | |

FOREIGN PATENT DOCUMENTS

JP   02-270848 A   11/1990
JP   03-207717 A   9/1991

(Continued)

OTHER PUBLICATIONS

Crawford G.P., Flexible Flat Panel Displays, New York: Wiley: 2005, 1.1-3.7.4.

(Continued)

*Primary Examiner* — Ana Woodward
(74) *Attorney, Agent, or Firm* — Cantor Colburn LLP

(57) ABSTRACT

A composition including a plurality of oligomers including at least one selected from a repeating unit represented by Chemical Formula 1, a repeating unit represented by Chemical Formula 2, and a combination thereof; and at least one selected from a repeating unit represented by Chemical Formula 3, a repeating unit represented by Chemical Formula 3A, and a combination thereof; wherein at least a part of the plurality of oligomers includes at least one terminal end having an amino group, and wherein at least a part of the plurality of oligomers including at least one terminal end having an amino group is a diamine having a pKa value of equal to or less than 3 at 25° C.:

Chemical Formula 1

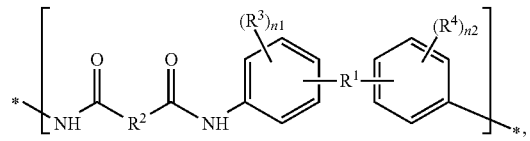

Chemical Formula 2

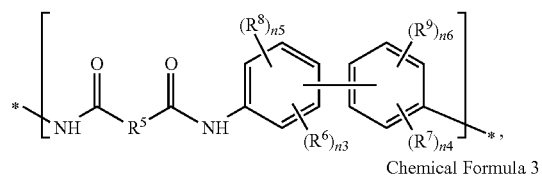

Chemical Formula 3

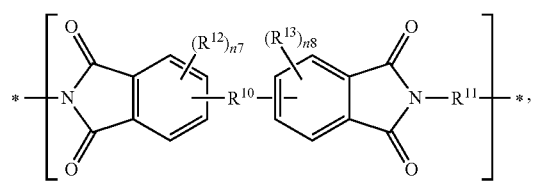

Chemical Formula 3A

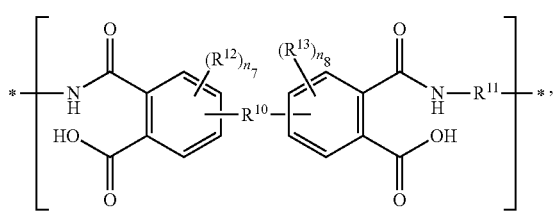

wherein the variables in Chemical Formulae 1, 2, 3, and 3A are described in the specification.

13 Claims, 7 Drawing Sheets

(56) References Cited

FOREIGN PATENT DOCUMENTS

| JP | 1994-006563 A | 1/1994 |
|---|---|---|
| JP | 2010-180292 A | 8/2010 |

OTHER PUBLICATIONS

Mittal K.L., Polyimides and other high temperature polymers: synthesis, characterization, vol. 2, 3.4.3, Optical Properties, Utrecht: VSP: 2003.

Mittal K.L., Polyimides and other high temperature polymers: synthesis, characterization, vol. 2, 3.7, Optical Properties, Utrecht: VSP: 2003.

Buch et al, "Synthesis, characterization and thermal properties of soluble aromatic poly(amide imide)s", Polymer, vol. 46, 2005, pp. 5524-5532.

Chen et al., "Synthesis and Characterization of Polyimide/Silica Hybrid Composites", Chem. Mater. vol. 11, 1999, pp. 1218-1222.

Cheng et al., "Stress control for overlay registration in a-Si:H TFTs on flexible organic-polymer-foil substrates", Journal of the SID 13/7, 2005, pp. 563-568.

Cheng et al., "Synthesis of New Soluble Aromatic Poly(annide imide)s from Unsymmetrical Extended Diamine containing Phthalazinone Moiety", Jornal of Applied Polymer Science, vol. 92, 2004, pp. 1516-1520.

Geffroy et al., "Organic light-emitting diode (OLED) technology: materials, devices and display technologies", Polymer International, vol. 55, 2006, pp. 572-582.

Gu et al., "Vacuum-deposited, nonpolymeric flexible organic light-emitting devices", Optics Letters, vol. 22, No. 3, Feb. 1, 1997, pp. 172-174.

Hasegawa et al., "Photophysics, photochemistry, and optical properties of polyimides", Prog. Polym. Sci., vol. 26, 2001, pp. 259-335.

Hedrick et al., "Polymeric Organic-Inorganic Hybrid Nanocomposites: Preparation of Polyimide-Modified Poly (silsesquioxane) Using Functionalized Poly(amic acid alkylester) Precursors", Macromolecules, vol. 30, 1997, pp. 8512-8515.

Jeong et al, "Synthesis and characterization of novel polyimides containing flourine and phosphine oxide moieties", Polymer, vol. 42, 2001, pp. 6019-6030.

Jin et al., "Flexible AMOLED displays on stainless-steel foil", Journal of the SID, 14/12, 2006, pp. 1083-1090.

Kovalev et al.,"Synthesis of transparent and thermally sable polyimide-aramid ananocomposites-Prospectie materials for high-temperature electronic manufacture applications", Polymer, 54, 2013, pp. 127-133.

Krajewska et al., "Tetralactam-modified gold electrodes for amperometric detection of acrylic acid", Supramolecular chemistry, vol. 21, No. 6, Sep. 2009, pp. 520-531.

Lee et al., "Synthesis of colorless imide hybrid nanocomposites using amine functionalized oligosilozane nano-building clusters", Journal of Materials Chemistry, vol. 16, 2006, pp. 1657-1664.

Liaw et al., "Novel Organosoluble Poly(amide-imide)s Derived from Kink Diamine Bis[4-(4-trimellitimidophenoxy)pheny]-diphenylmethane. Synthesis and Characterization", Macromol. chem. Phys., vol. 202, No. 9, 2001, pp. 1483-1487.

Liaw et al., "Synthesis and characterization of new highly organosoluble poly(ether imide)s derived from 1,1-bix[4-(4-dicarboxyphenoxy)phenyl]-4-tert-butylcyclohexane dianhydride", Polymer, vol. 42, 2001, pp. 7993-7998.

Liaw et al., "Synthesis and Characterization of New Highly Organosoluble Poly(ether imide)s Bearing a Noncoplanar 2,2'-Dimethyl-4,4'-biphenyl Unit and Kink Diphenylmethylene Linkage", Chem. Mater., vol. 13, 2001, pp. 1811-1816.

Lim et al., "Flexible Organic Electroluminescent Devices Based on Fluorine-containing Colorless Polyimide Substrates", Advanced Materials, vol. 14, No. 18, Sep. 16, 2002, pp. 1275-1279.

Liou et al., "Synthesis and Evaluation of Photoluminescent and Electrochemical Propoerties of New Aromatic Polyamides and Polyimides with a kink 1, 2-Phenylenediamine Moiety", Journal of Polymer Science: Part A: Polymer Chemistry, vol. 44, 2006, pp. 2587-2603.

Long et al.,"P-24: High-Temperature (250 C} Amorphous-Silicon TFT's on Clear Plastic Substrates", SID 05 Digest, 2005, pp. 313-315.

Morikawa et al., "Preparation of New Polyimide-Silica Hybrid Materials via the Sol-Gel Process", J. Mater. Chem., vol. 2(7), 1992, pp. 679-690.

Myung et al., "Synthesis and characterization of polyimides from novel 1-(3',5'-bis(trifluoromethyl)benzene) pyromelliticdianhydride (6FPPMDA)", Polymer, vol. 45, 2004, pp. 3185-3193.

Stewart et al., "Polysilicon TFT Technology for Active Matrix OLED Displays", IEEE Transactions on Electron Devices, vol. 48, No. 5, May 2001, pp. 845-851.

Tang et al., "Organic Electroluminescent Diodes", Physics, vol. 38, pp. 356-357.

Van Der Wilt et al., "34.4: High Performance CMOS-on-Plastice Circuits using Sequential Laterally Solidified Silicon TFTs", SID Digest, 2006, pp. 1365-1367.

POLY(IMIDE-AMIDE) COPOLYMER AND COMPOSITION INCLUDING POLY(IMIDE-AMIDE) COPOLYMER

CROSS-REFERENCE TO RELATED APPLICATION

This application claims priority to and the benefit of Korean Patent Application No. 10-2013-0101147, filed on Aug. 26, 2013, and all the benefits accruing therefrom under 35 U.S.C. §119, the content of which is incorporated herein in its entirety by reference.

BACKGROUND

1. Field

This disclosure relates to a poly(imide-amide) copolymer, and to a composition including a poly(imide-amide) copolymer.

2. Description of the Related Art

A colorless transparent material has been researched for diverse purposes such as for an optical lens, a functional optical film, and a disk substrate. But as information devices are being further miniaturized and display devices are providing higher resolution, more functions and greater performance are required from the material.

Therefore, there remains a need for a colorless transparent material having excellent transparency, heat resistance, mechanical strength, and flexibility

SUMMARY

An embodiment provides a composition including a poly (imide-amide) copolymer having improved storage stability.

Another embodiment provides a poly(imide-amide) copolymer prepared from a poly(imide-amide) copolymer having improved storage stability, and an article including the poly(imide-amide) copolymer.

According to an embodiment, provided is a composition including a plurality of oligomers including (i) at least one selected from a repeating unit represented by Chemical Formula 1, a repeating unit represented by Chemical Formula 2, and a combination thereof;

(ii) at least one selected from a repeating unit represented by Chemical Formula 3, a repeating unit represented by Chemical Formula 3A, and a combination thereof;

wherein at least a part of the plurality of oligomers includes at least one terminal end having an amino group, and wherein at least a part of the plurality of oligomers includes at least one terminal end including an amino group is a diamine having a pKa value of equal to or less than 3 at 25° C.:

Chemical Formula 1

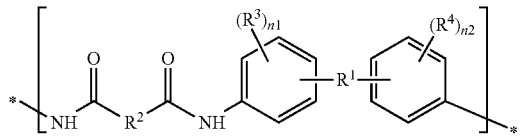

wherein, in Chemical Formula 1, $R^1$ is the same or different in each repeating unit, and is each independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and is each independently a substituted or unsubstituted C6 to C30 aromatic organic group, $R^3$ and $R^4$ are the same or different and are each independently a halogen, a hydroxy group, a substituted or unsubstituted C1 to C10 aliphatic organic group, a C6 to C20 aromatic organic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different, and are each independently hydrogen or a C1 to C10 aliphatic organic group, and n1 and n2 are each independently integers ranging from 0 to 4, Chemical Formula 2

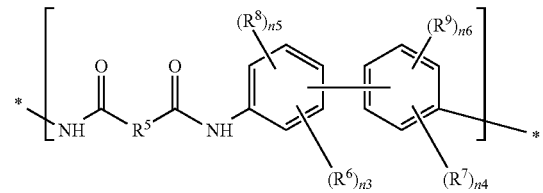

wherein, in Chemical Formula 2, $R^5$ is the same or different in each repeating unit, and is each independently a substituted or unsubstituted C6 to C30 aromatic organic group, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and are each independently hydrogen or a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3, and provided that n4+n6 is an integer ranging from 1 to 4, Chemical Formula 3

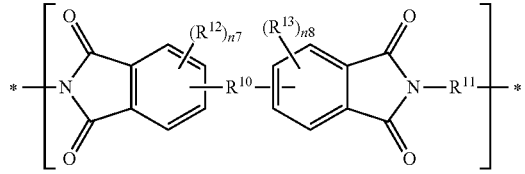

Chemical Formula 3A

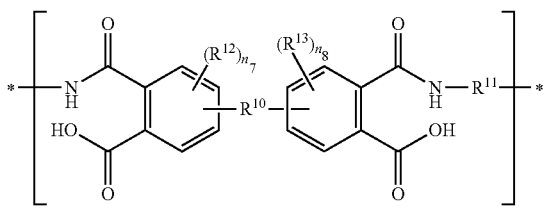

wherein, in Chemical Formulae 3 and 3A, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each repeating unit, and each independently includes a substituted or unsubstituted C6 to C30 aromatic organic group, wherein the aromatic organic group includes one aromatic ring, two or more aromatic rings fused together to provide a condensed ring system, or two or more moieties independently selected from one aromatic ring and two or more aromatic rings fused together to provide a condensed ring system linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, and n7 and n8 are each independently integers ranging from 0 to 3.

In the above composition, the diamine having a pKa value of equal to or less than 3 at 25° C. may be represented by Chemical Formula 4:

Chemical Formula 4

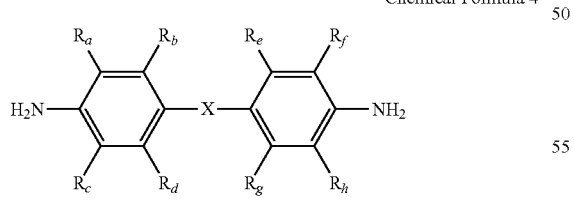

wherein, in Chemical Formula 4,

X may be a single bond, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤p≤10, —C(CH$_3$)$_2$—, —C(=O)NH—, —C(CF$_3$)$_2$—, —C(CCl$_3$)$_2$—, —C(CBr$_3$)$_2$—, or —C(Cl$_3$)$_2$—, $R_a$ to $R_h$ may be the same or different, and are each independently a halogen, a hydroxy group, a substituted or unsubstituted C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, provided that when X is a single bond, two or more of $R_a$ to $R_d$ and two or more or $R_e$ to $R_h$ are not hydrogen.

The diamine having a pKa value of equal to or less than 3 at 25° C. may be represented by Chemical Formula c to Chemical Formula h:

Chemical Formula c

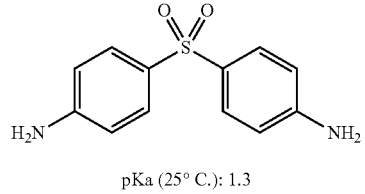

pKa (25° C.): 1.3

Chemical Formula d

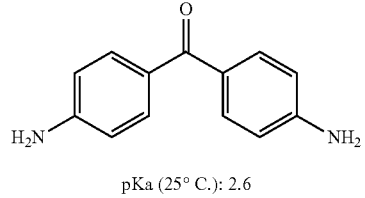

pKa (25° C.): 2.6

Chemical Formula e

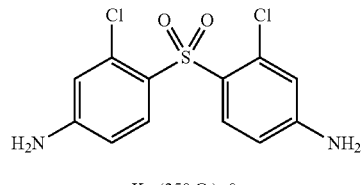

pKa (25° C.): 0

Chemical Formula f

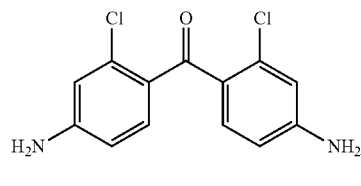

pKa (25° C.): 1.8

Chemical Formula g

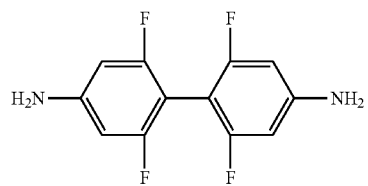

pKa (25° C.): 2.8

Chemical Formula h

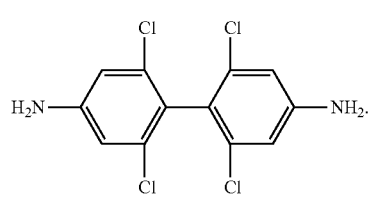

pKa (25° C.): 2.5

The composition according to the embodiment may include an oligomer including two terminal ends and further including an anhydride group disposed at each of the two terminal ends, an oligomer including two terminal ends and further including an amino group disposed at each of the two terminal ends, and an oligomer including two terminal ends and further including an amino group disposed at one terminal end and an anhydride group disposed at the other terminal end.

Alternatively, the composition may include an oligomer including two terminal ends and further including an anhydride group disposed at each of the two terminal ends, and another oligomer including two terminal ends and further including an amino group disposed at each of the two terminal ends. Further, the composition according to an embodiment may include oligomers including two terminal ends and further including an anhydride group disposed at one terminal end and an amino group disposed at the other terminal end.

In the above three cases, the total mole number of the anhydride group disposed at the terminal ends and the total mole number of the amino group disposed at the terminal ends may be about 1:1.

The diamine having a pKa value of equal to or less than 3 at 25° C. may be present in an amount of equal to or less than about 30 mole %, for example from about 0.5 mole % to about 25 mole %, based on the total mole number of the repeating unit represented by the Chemical Formula 1, the repeating unit represented by the Chemical Formula 2, and the repeating unit represented by the Chemical Formula 3 in the composition.

Each oligomer in the composition may have a weight average molecular weight of about 10,000 gram/mole to about 20,000 gram/mole.

Each oligomer may have the same or similar molecular weight in the composition.

Each oligomer may have about 1 to 1,000 of each of the repeating unit represented by the Chemical Formula 1, the repeating unit represented by the Chemical Formula 2, and the repeating unit represented by the Chemical Formula 3.

Particularly, in Chemical Formula 1, $R^1$ may be selected from the following chemical formulae.

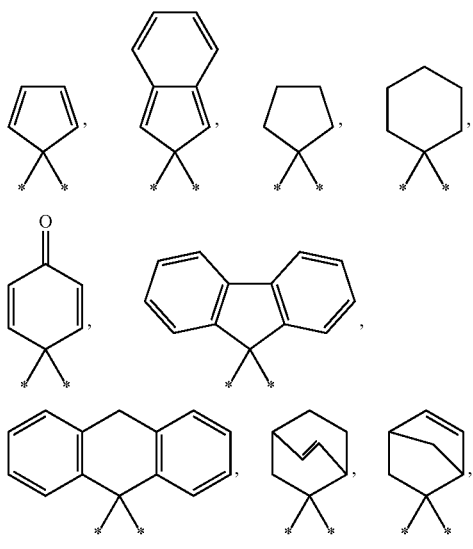

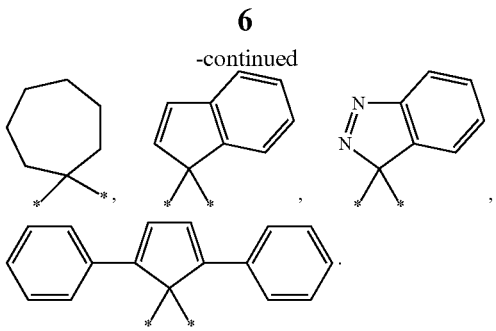

Particularly, in Chemical Formula 2, the $R^6$ and $R^7$ may be the same or different, and may be each independently selected from $-CF_3$, $-CCl_3$, $-CBr_3$, $-Cl_3$, $-NO_2$, $-CN$, a C1 to C2 alkanoyl group, or a C1 to C6 ester group. The C1 to C2 alkanoyl group may be $-C(=O)CH_3$, and the C1 to C6 ester group may be $-CO_2C_2H_5$.

Particularly, in above Chemical Formulae 1 and 2, $R^2$ and $R^5$ may be the same or different and may be each independently selected from chemical formulae.

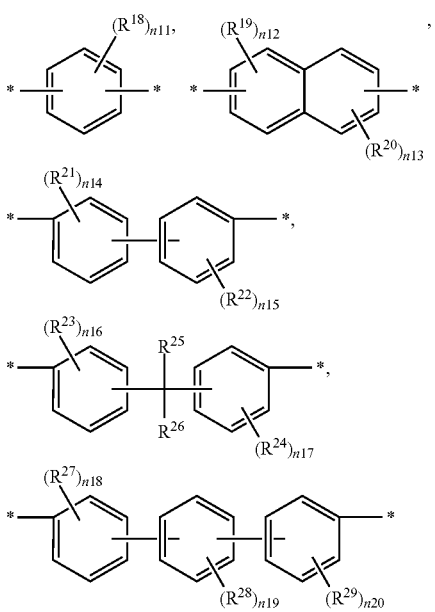

wherein, in chemical formulae, $R^{18}$ to $R^{29}$ are the same or different, and are each independently a halogen, a substituted or unsubstituted C1 to C10 aliphatic organic group, or a substituted or unsubstituted C6 to C20 aromatic organic group, n11 and n14 to n20 are each independently integers ranging from 0 to 4, and n12 and n13 are each independently integers ranging from 0 to 3.

More particularly, $R^2$ and $R^5$ may be the same or different and may be independently selected from chemical formulae.

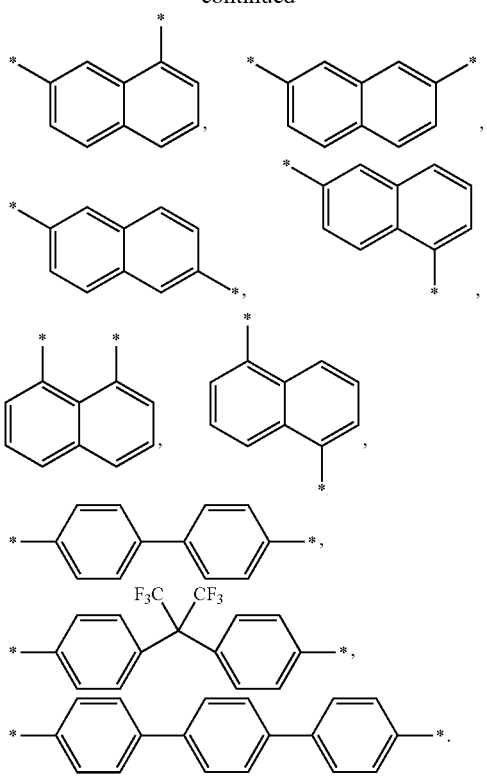

Particularly, the repeating unit represented by the Chemical Formula 3 may include a repeating unit represented by Chemical Formula 5 or a repeating unit represented by Chemical Formula 6.

Chemical Formula 5

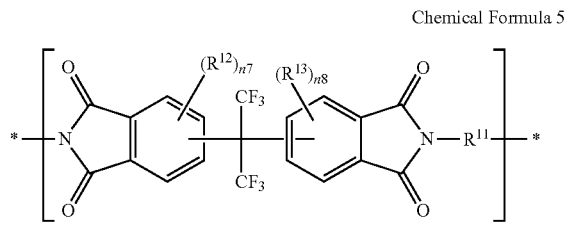

wherein, in Chemical Formula 5, $R^{11}$, $R^{12}$, $R^{13}$, n7, and n8 are the same as described in the above Chemical Formula 3.

Chemical Formula 6

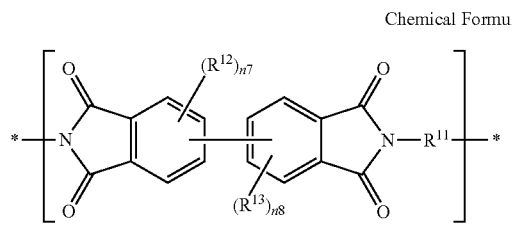

In Chemical Formula 6, $R^{11}$, $R^{12}$, $R^{13}$, n7, and n8 are the same as described in the above Chemical Formula 3.

Particularly, the repeating unit represented by the Chemical Formula 1 may include a repeating unit represented by Chemical Formula 7, a repeating unit represented by Chemical Formula 8, a repeating unit represented by Chemical Formula 9, or a combination thereof;

the repeating unit represented by the Chemical Formula 2 may include a repeating unit represented by Chemical Formula 10, a repeating unit represented by Chemical Formula 11, a repeating unit represented by Chemical Formula 12, or a combination thereof; and the repeating unit represented by the Chemical Formula 3 may include a repeating unit represented by Chemical Formula 13, a repeating unit represented by Chemical Formula 14, or a combination thereof.

Chemical Formula 7

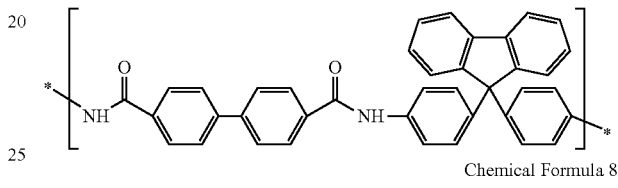

Chemical Formula 8

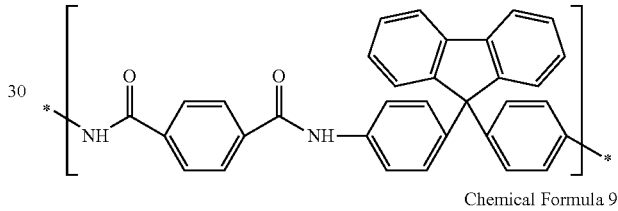

Chemical Formula 9

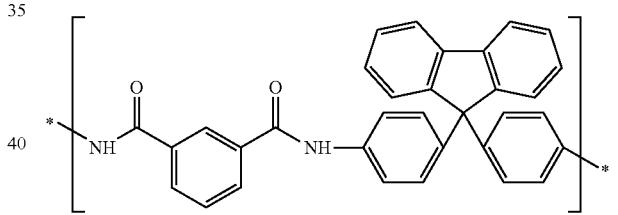

Chemical Formula 10

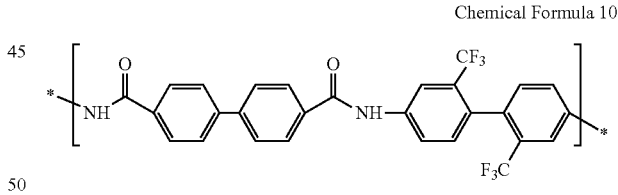

Chemical Formula 11

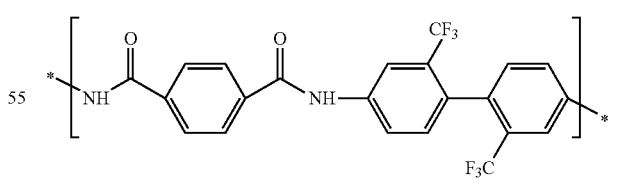

Chemical Formula 12

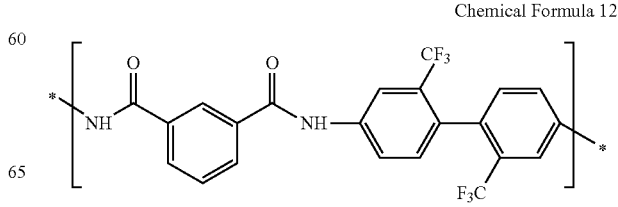

-continued

Chemical Formula 13

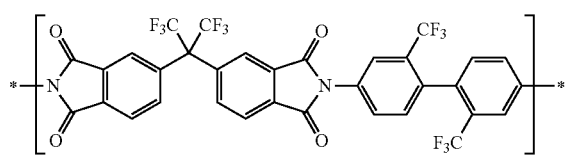

Chemical Formula 14

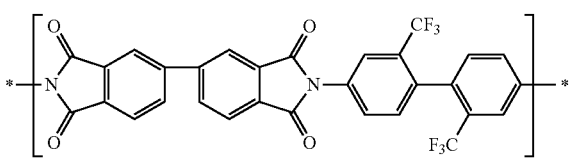

According to another embodiment, provided is a method of preparing a poly(imide-amide) copolymer including polymerizing the above composition.

In the above composition a part of the plurality of oligomers may include at least one terminal end including an amino group, and another part of the plurality of oligomers may include at least one terminal end including an anhydride group, wherein the total mole ratio between the amino groups at the terminal ends and the anhydride groups at the terminal ends is about 1:1, and thus a poly(imide-amide) copolymer having a high molecular weight can be prepared by polymerizing the oligomers.

According to still another embodiment, provided is a poly (imide-amide) copolymer including (i) at least one selected from a repeating unit represented by Chemical Formula 1, a repeating unit represented by Chemical Formula 2, and a combination thereof;

(ii) at least one selected from a repeating unit represented by Chemical Formula 3, a repeating unit represented by Chemical Formula 3A, and a combination thereof; and (iii) at least one selected from a repeating unit represented by Chemical Formula 15, a repeating unit represented by Chemical Formula 15A, and a combination thereof:

Chemical Formula 1

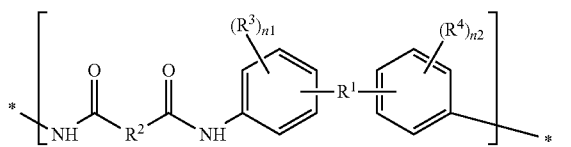

wherein, in Chemical Formula 1, $R^1$ is the same or different in each repeating unit, and is independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and is independently a substituted or unsubstituted C6 to C30 aromatic organic group, $R^3$ and $R^4$ are the same or different and are independently a halogen, a hydroxy group, a substituted or unsubstituted C1 to C10 aliphatic organic group, a C6 to C20 aromatic organic group, an alkoxy group of formula $-OR^{200}$, wherein $R^{200}$ is a C1 to C10 aliphatic organic group, or a silyl group of formula $-SiR^{201}R^{202}R^{203}$, wherein $R^{201}$, $R^{202}$, and $R^{203}$ are the same or different, and are independently hydrogen or a C1 to C10 aliphatic organic group, and n1 and n2 are independently integers ranging from 0 to 4.

Chemical Formula 2

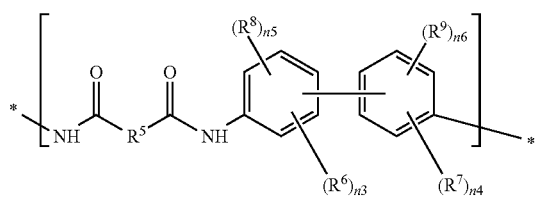

wherein, in Chemical Formula 2, $R^5$ is the same or different in each repeating unit, and is each independently a substituted or unsubstituted C6 to C30 aromatic organic group, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$, and $R^{207}$ are the same or different, and are each independently hydrogen or a C1 to C10 aliphatic organic group, n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3, and
provided that n4+n6 is an integer ranging from 1 to 4.

Chemical Formula 3

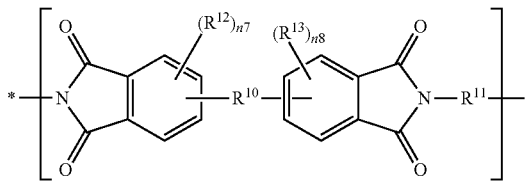

Chemical Formula 3A

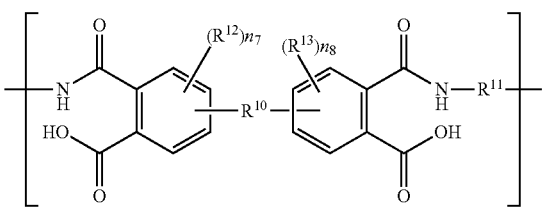

wherein, in Chemical Formulae 3 and 3A, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each repeating unit, and each independently includes a substituted or unsubstituted C6 to C30 aromatic organic group, wherein the aromatic organic group is one aromatic ring, two or more aromatic rings fused together to provide a condensed ring system, or two or more moieties independently selected from one aromatic ring and two or more aromatic rings fused together to provide a condensed ring system, linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{209}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

Chemical Formula 15

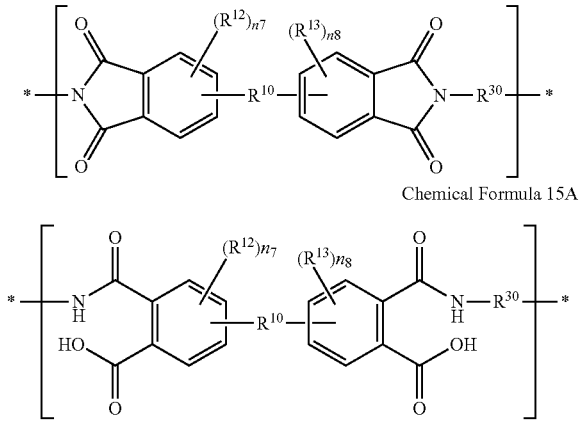

Chemical Formula 15A wherein, in Chemical Formula 15, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{30}$ is the same or different in each repeating unit, and each independently includes a substituted or unsubstituted C6 to C30 aromatic organic group, wherein the aromatic organic group includes two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, and wherein if the two or more moieties are linked through a single bond, then each of the two or more moieties is substituted with one or more halogen, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{209}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

Particularly, the repeating unit represented by the Chemical Formula 1 may include a repeating unit represented by Chemical Formula 7, a repeating unit represented by Chemical Formula 8, a repeating unit represented by Chemical Formula 9, or a combination thereof;

the repeating unit represented by the Chemical Formula 2 may include a repeating unit represented by Chemical Formula 10, a repeating unit represented by Chemical Formula 11, a repeating unit represented by Chemical Formula 12, or a combination thereof;

the repeating unit represented by the Chemical Formula 3 may include a repeating unit represented by Chemical Formula 13, a repeating unit represented by Chemical Formula 14, or a combination thereof; and the repeating unit represented by the Chemical Formula 15 may include a repeating unit represented by Chemical Formula 16, a repeating unit represented by Chemical Formula 17, or a combination thereof.

Chemical Formula 7

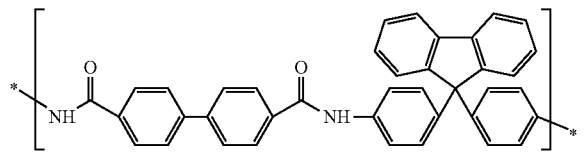

Chemical Formula 8

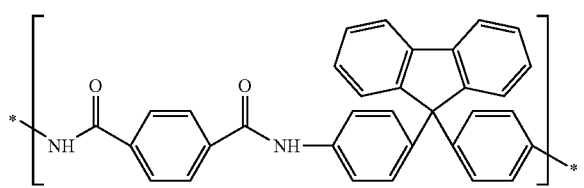

Chemical Formula 9

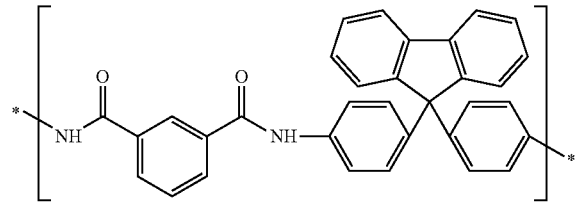

Chemical Formula 10

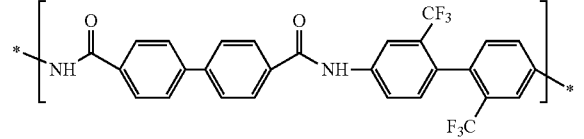

Chemical Formula 11

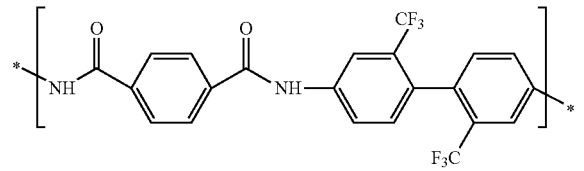

-continued

Chemical Formula 12

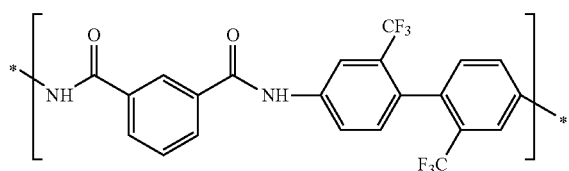

Chemical Formula 13

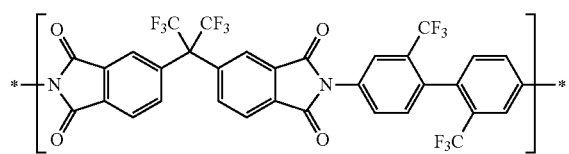

Chemical Formula 14

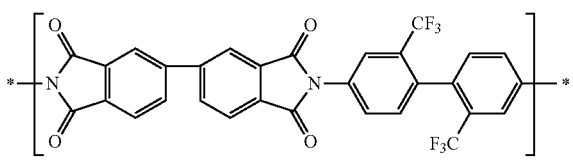

Chemical Formula 16

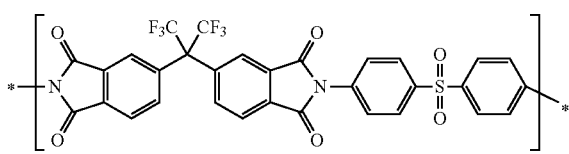

Chemical Formula 17

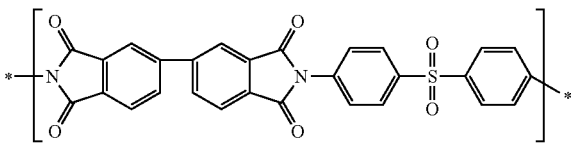

In an exemplary embodiment, provided is a poly(imide-amide) copolymer including (i) a repeating unit represented by Chemical Formula 10, (ii) a repeating unit represented by Chemical Formula 13, a repeating unit represented by Chemical Formula 14, or a repeating unit represented by a combination of Chemical Formula 13 and Chemical Formula 14, and (iii) a repeating unit represented by Chemical Formula 16, a repeating unit represented by Chemical Formula 17, or a repeating unit represented by a combination of Chemical Formula 16 and Chemical Formula 17:

Chemical Formula 10

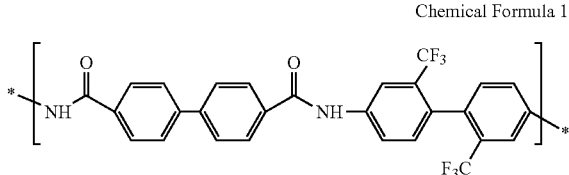

Chemical Formula 13

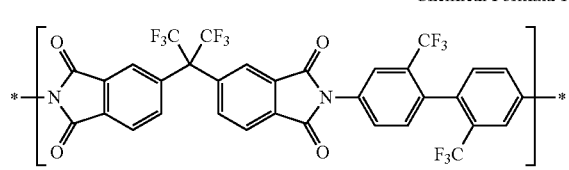

-continued

Chemical Formula 14

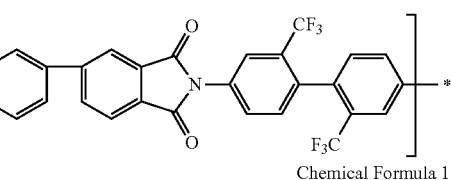

Chemical Formula 16

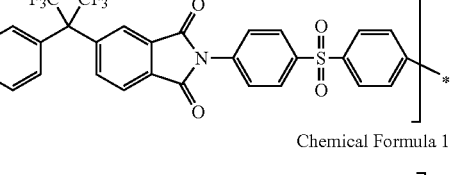

Chemical Formula 17

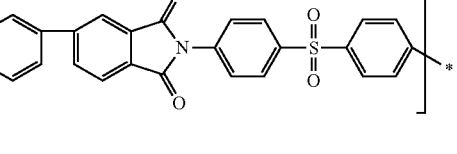

According to yet another embodiment, provided is an article including the poly(imide-amide) copolymer.

Particularly, the article may be a film, a fiber, a coating material, or an adhesive.

The article may have total light transmittance of greater than or equal to about 80% in a wavelength range of 380 nanometers to 750 nanometers, and the article may have light transmittance of greater than or equal to about 55% for light of a 400 nanometer wavelength.

Particularly, the article may have light transmittance of greater than or equal to about 60% for light of a 430 nanometer wavelength.

The article may have a coefficient of thermal expansion ("CTE") of less than or equal to about 25 parts per million per degree Centigrade ("ppm/° C.").

Particularly, the article may have a coefficient of thermal expansion ("CTE") of less than or equal to about 20 ppm/° C.

The article may have a haze of less than or equal to about 5%.

The article may have a yellowness index ("YI") of less than or equal to about 10%.

According to still another embodiment, provided is a display device including the article.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
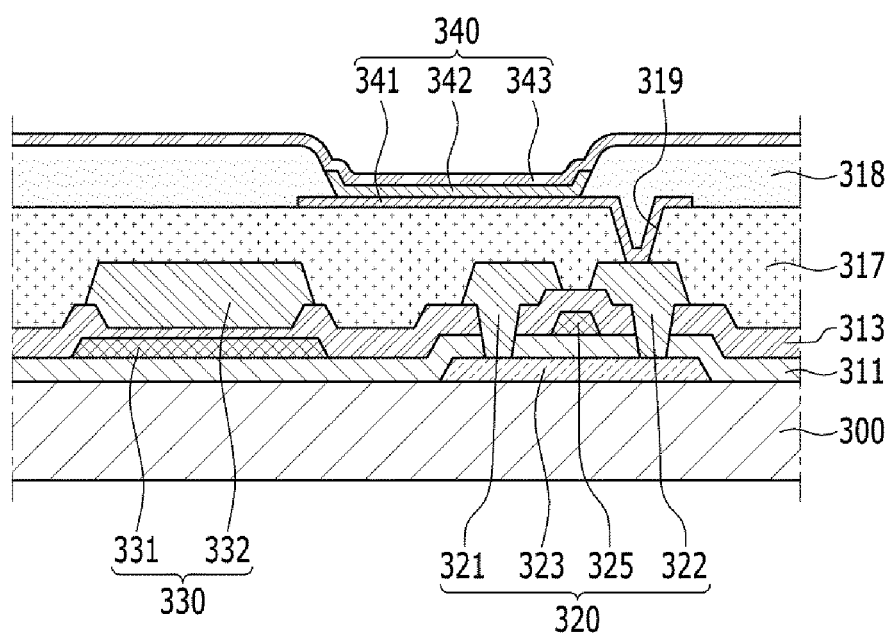
FIG. 1 is a cross-sectional view of an organic light emitting diode ("OLED") in accordance with an embodiment.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$)(R$^{102}$), wherein R$^{100}$, R$^{101}$ and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "ester group" refers to "alkyl-O—C(=O)—", wherein the term "alkyl" has the same meaning as described above. Non-limiting examples of the ester group are methoxycarbonyl, ethoxycarbonyl, and propoxycarbonyl.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refer to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, and specifically through —S(=O)$_2$—, for example an aryl group or a C6 to C30 arylene group, specifically a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment to another atom.

Poly(imide-aramide) copolymer has excellent thermal, mechanical, and optical properties, and thus is useful in preparing a plastic substrate for OLED or LCD. There is a problem, however, in preparing poly(imide-aramide) copolymer, which involves HCl produced as a by-product during the process of preparing aramide, as described in the following Reaction Formula 1.

Reaction Formula 1

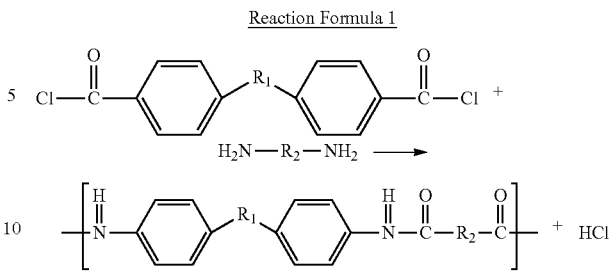

The HCl causes corrosion of an element of an apparatus, and thus should necessarily be removed by precipitation.

Poly(imide-aramide) copolymer, however, may reduce its molecular weight during the precipitation process due to breakage of amic acids with water. Further, imidization is partially processed during the process of removing water, and thus the resulting copolymer may not dissolve or may have reduced solubility in a solvent, such as DMAc or NMP, etc. The reduction in molecular weight of the copolymer due to the breakage of amic acids may also cause whiteness of a film prepared from the copolymer.

Meanwhile, an oligomer having a low molecular weight is used in preparing a substrate for OLED, since low viscosity is required for coating. In this case, a property of a film may be affected by the group attached to the terminal end of the oligomer. Polyimide may be prepared by reacting monomers of a dianhydride and a diamine, in which an excess of a dianhydride or a diamine is used for preparing an oligomer having a low molecular weight. In this case, however, if an excess of dianhydride is used, the dianhydride may react with water to form a carboxylic acid, which makes it difficult to form a polymer as the carboxylic acid may react with an amine. When an excess of amine is used, the amine may be oxidized during the process of precipitation and drying.

If an amine containing an amide is used, precipitation process may be omitted, which makes it possible to prevent the property of a poly(imide-amide) film from being deteriorated.

Meanwhile, a substrate for OLED should be maintained colorless and transparent, and should not outgas at a high temperature of 400° C. or more. An oligomer including a terminal end having an amine may be oxidized to change color at a high temperature, while an oligomer including a terminal end having an anhydride may react with water in air to form a carboxylic acid, which may produce CO$_2$ by a dicarboxylation reaction at a temperature of 350° C. or more to cause an outgassing problem. Further, the coefficient of thermal expansion ("CTE") of a poly(imide-aramide) copolymer may become high, if the molecular weight of the copolymer is low.

According to an embodiment, in order to solve the above problems, provided is a composition for preparing a poly (imide-amide) copolymer, wherein the composition includes a plurality of (amide-amic acid) oligomers when kept in a storage, while forming poly(imide-amide) copolymers by polymerizing the (amide-amic acid) oligomers, followed by curing, when being used.

Particularly, the composition includes a plurality of oligomers including (i) at least one selected from a repeating unit represented by following Chemical Formula 1, a repeating unit represented by following Chemical Formula 2, and a combination thereof; and (ii) at least one of a repeating unit represented by following Chemical Formula 3, a repeating unit represented by following Chemical Formula 3A, and a combination thereof, wherein at least a part of the plurality of oligomers includes at least one terminal end having an amino group, and wherein at least a part of plurality of oligomers comprises at least one terminal end comprising an amino group is a diamine having a pKa value of equal to or less than 3 at 25° C.:

Chemical Formula 1

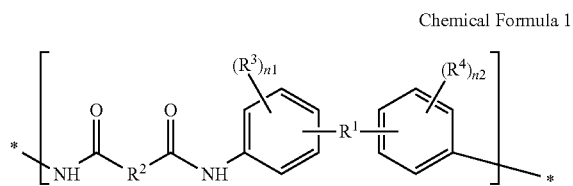

In Chemical Formula 1, $R^1$ is the same or different in each repeating unit, and is each independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and is each independently a substituted or unsubstituted C6 to C30 aromatic organic group, $R^3$ and $R^4$ are the same or different and are each independently a halogen, a hydroxy group, a substituted or unsubstituted C1 to C10 aliphatic organic group, a C6 to C20 aromatic organic group, an alkoxy group of formula $-OR^{200}$, wherein $R^{200}$ is a C1 to C10 aliphatic organic group, or a silyl group of formula $-SiR^{201}R^{202}R^{203}$, wherein $R^{201}$, $R^{202}$, and $R^{203}$ are the same or different, and are each independently hydrogen or a C1 to C10 aliphatic organic group, and n1 and n2 are each independently integers ranging from 0 to 4.

Chemical Formula 2

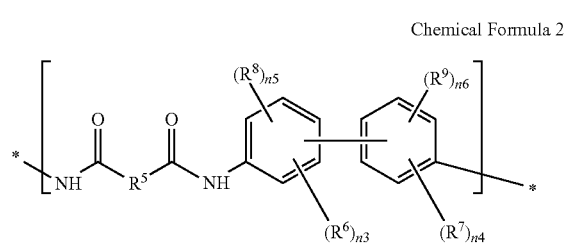

In Chemical Formula 2, $R^5$ is the same or different in each repeating unit, and is each independently a substituted or unsubstituted C6 to C30 aromatic organic group, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$, and $R^{207}$ are the same or different, and are each independently hydrogen or a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3, and n4+n6 is an integer ranging from 1 to 4.

Chemical Formula 3

Chemical Formula 3A

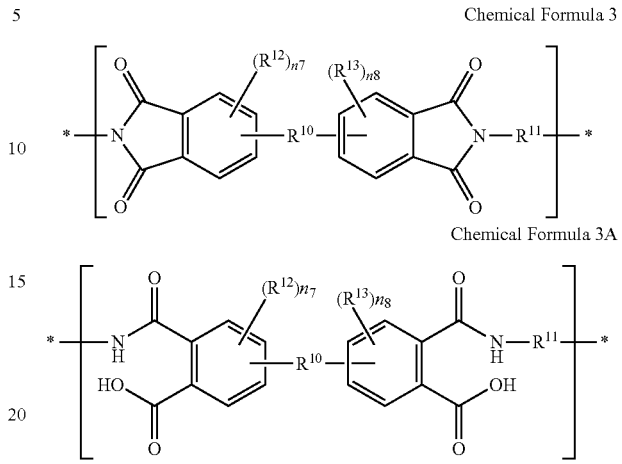

In Chemical Formulae 3 and 3A, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each repeating unit, and each independently includes a substituted or unsubstituted C6 to C30 aromatic organic group, wherein the aromatic organic group includes one aromatic ring, two or more aromatic rings fused together to provide a condensed ring system, or two or more moieties independently selected from one aromatic ring and two or more aromatic rings fused together to provide a condensed ring system linked through a single bond or through a functional group selected from a fluorenylene group, $-O-$, $-S-$, $-C(=O)-$, $-CH(OH)-$, $-S(=O)_2-$, $-Si(CH_3)_2-$, $-(CH_2)_p-$, wherein $1 \leq p \leq 10$, $-(CF_2)_q-$, wherein $1 \leq q \leq 10$, $-C(CH_3)_2-$, $-C(CF_3)_2-$, and $-C(=O)NH-$, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula $-OR^{208}$, wherein $R^{208}$ is a C1 to C10 aliphatic organic group, or a silyl group of formula $-SiR^{209}R^{210}R^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

An acid dissociation constant, $K_a$, is a quantitative measure of the strength of an acid in solution. It is the equilibrium constant for a chemical reaction known as dissociation in the context of an acid-base reaction. The equilibrium may be represented by following Equation 1.

$$HA \rightleftharpoons A^- + H^+$$  Equation 1

In Equation 1, HA is a generic acid that dissociates by splitting into $A^-$ (the counter base of the acid) and $H^+$ (the hydrogen ion or proton).

The chemical species HA, $A^-$, and $H^+$ are said to be in equilibrium when their concentrations do not change as time passes. The dissociation constant, $K_a$, is usually written as a quotient of the equilibrium concentrations (in moles per liter, mol/L), denoted by [HA], [A⁻], and [H⁺], as represented by following Equation 2.

$$K_a = \frac{[A^-][H^+]}{[HA]} \qquad \text{Equation 2}$$

The logarithmic constant, $pK_a$, which is equal to $-\log_{10}K_a$, is also referred to as an acid dissociation constant, as represented by following Equation 3.

$$pK_a = -\log_{10}K_a \qquad \text{Equation 3}$$

That is, the larger the value of pKa, the smaller the extent of dissociation of the acid at any given pH, which means the acid is a weak acid. The smaller the value of pKa, the stronger the acid is.

It is known that the reactivity of an amine is proportional to pKa. That is, the lower the value of pKa, the less reactive the amine is. As such, it is believed that by introducing an electron withdrawing group to the center of a molecule of a diamine, the value of pKa of the diamine can become lowered.

Accordingly, according to the above embodiment, the composition includes oligomers including at least one terminal end having an amino group, and at least a part of the oligomers including the amino group is a diamine having a pKa value of equal to or less than 3 at 25° C. As confirmed by the examples described later, even when the mole ratio between the terminal ends having an amino group and the terminal ends having an anhydride group is about 1:1 in the composition, the composition has drastically improved storage stability, as the polymerization reaction between the oligomers including a terminal end having an amino group and the oligomers including a terminal end having an anhydride group is inhibited.

Accordingly, the composition includes oligomers including a terminal end having an amino group and oligomers including a terminal end having an anhydride group in a mole ratio of about 1:1, in which at least a part of the oligomers including a terminal end having an amino group is a diamine having a pKa value of equal to or less than 3 at 25° C. The diamine may be present at about 30 mole % or less based on the total mole number of the repeating units represented by Chemical Formula 1, represented by Chemical Formula 2, and represented by Chemical Formula 3, contained in the composition.

In an exemplary embodiment, the diamine having a pKa value of equal to or less than 3 at 25° C. may be present from about 0.5 mol % to about 25 mol % based on the total mole number of the repeating unit represented by Chemical Formula 1, the repeating unit represented by Chemical Formula 2, or a repeating unit represented by a combination of Chemical Formula 1 and Chemical Formula 2, and the repeating unit represented by Chemical Formula 3, contained in the composition.

When a diamine having a pKa value of equal to or less than 3 at 25° C. is present at a terminal end of an oligomer in the above range in the above composition, the viscosity of the composition hardly changes when stored in a refrigerator, even when the composition includes oligomers including a terminal end having an amino group at the terminal end and oligomers including a terminal end having an anhydride in a mole ratio of about 1:1, which allows the composition to be used for spin-coating for preparing a poly(imide-amide) copolymer.

If the content of the diamine having a pKa value of equal to or less than 3 at 25° C. exceeds the above range, the composition may not be easily polymerized to form a poly(imide-amide) copolymer. On the contrary, if the diamine is present less than the above content, the composition may not have improved storage stability.

The diamine having a pKa value of equal to or less than 3 at 25° C. may be represented by following Chemical Formula 4:

Chemical Formula 4

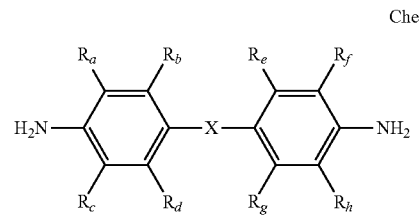

In Chemical Formula 4,

X may be a single bond, —O—, —S—, —C(=O)—, —CH(OH)—, —S(=O)₂—, —Si(CH₃)₂—, —(CH₂)$_p$—, wherein 1≤p≤10, —(CF₂)$_q$—, wherein 1≤q≤10, —C(CH₃)₂—, —C(=O)NH—, —C(CF₃)₂—, —C(CCl₃)₂—, —C(CBr₃)₂—, or —C(Cl₃)₂—, $R_a$ to $R_h$ may be the same or different, and are each independently a halogen, a hydroxy group, a substituted or unsubstituted C1 to C10 aliphatic organic group, a C6 to C20 aromatic organic group, an alkoxy group of formula —OR²⁰⁸, wherein R²⁰⁸ is a C1 to C10 aliphatic organic group, or a silyl group of formula —SiR²⁰⁹R²¹⁰R²¹¹, wherein R²⁰⁹, R²¹⁰, and R²¹¹ are the same or different, and are each independently hydrogen or a C1 to C10 aliphatic organic group, provided that when X is a single bond, two or more of $R_a$ to $R_d$ and two or more or $R_e$ to $R_h$ are not hydrogen.

For example, the diamine having a pKa value of equal to or less than 3 at 25° C. may be represented by following Chemical Formula c to Chemical Formula h, which is not limited thereto:

Chemical Formula c

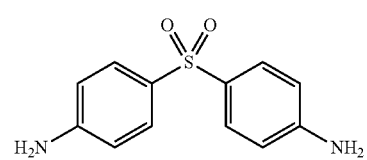

pKa (25° C.): 1.3

Chemical Formula d

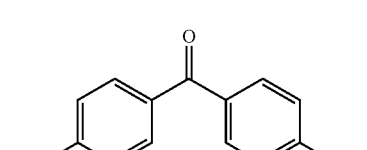

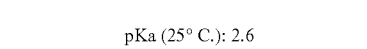

pKa (25° C.): 2.6

Chemical Formula e

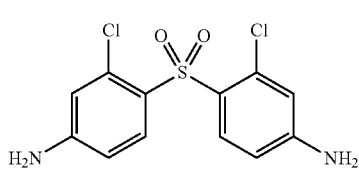

pKa (25° C.): 0

Chemical Formula f

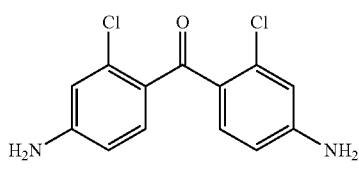

pKa (25° C.): 1.8

Chemical Formula g

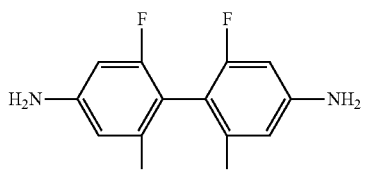

pKa (25° C.): 2.8

Chemical Formula h

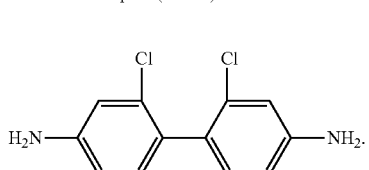

pKa (25° C.): 2.5

The pKa values of the diamines were calculated by using Advanced Chemistry Development (ACD/Labs) software v11.02(©1994-2012 ACD.Labs).

The composition according to an embodiment may include an oligomer including two terminal ends, wherein each of the two terminal ends has an anhydride group, an oligomer including two terminal ends, wherein each of the two terminal ends has an amino group, and an oligomer including a terminal end having an amino group and another terminal end having an anhydride group. Alternatively, the composition may include an oligomer including two terminal ends, wherein each of the two terminal ends has an anhydride group, and another oligomer including two terminal ends, wherein each of the two terminal ends has an amino group. Further, the composition may include oligomers including a terminal end having an anhydride group and another terminal end having an amino group.

In all the above three cases, the total mole number of the anhydride groups disposed at the terminal ends and the total mole number of the amino groups disposed at the terminal ends may be present in a ratio of about 1:1 in the composition.

The composition according to the above embodiment includes oligomers including a terminal end and having an anhydride group at that terminal end, and oligomers including a terminal end and having an amino group at that terminal end in a mole ratio of about 1:1. This composition may solve all the problems of the conventional compositions that include an excess of the oligomers including a terminal end and having an amino group at that terminal end or of the oligomers including a terminal end and having an anhydride group at that terminal end, in order to maintain the composition in oligomeric state. That is, it is possible to prevent color change of the copolymer due to the excess of the oligomers including a terminal end having an amino group at that terminal end, or the oxidation problem due to the excess of the oligomers including a terminal end having an anhydride group at that terminal end during the process of precipitation or drying, or an outgas due to $CO_2$. Further, by including oligomers including a terminal end having an anhydride group at that terminal end, and oligomers including a terminal end having an amino group in a mole ratio of about 1:1, a copolymer having a higher molecular weight may be prepared by copolymerization of the oligomers. A polymer having a high molecular weight tends to have a reduced CTE. Again, the composition may be stably stored without significant increase in viscosity as the oligomers are maintained in oligomeric state, and the composition may be easily applied by spin-coating, followed by curing, when being used, to prepare a poly(imide-amide) copolymer having excellent optical properties.

That is, the composition according to the above embodiment may be in oligomeric state when stored in a refrigerator to inhibit polymerization reaction among the oligomers, and may be easily applied by a well-known method, such as, a spin-coating, and polymerized and cured to prepare a poly (imide-amide) copolymer having excellent optical and thermal properties.

Each oligomer in the composition may have a weight average molecular weight of about 10,000 grams per mole ("g/mol") to about 20,000 g/mol.

Each oligomer may have the same or similar molecular weight in the composition.

Each oligomer may have about 1 to 1,000 of each of the repeating units represented by Chemical Formula 1, Chemical Formula 2, and Chemical Formula 3 in the composition.

Particularly, in Chemical Formula 1, $R^1$ may be selected from the following chemical formulae.

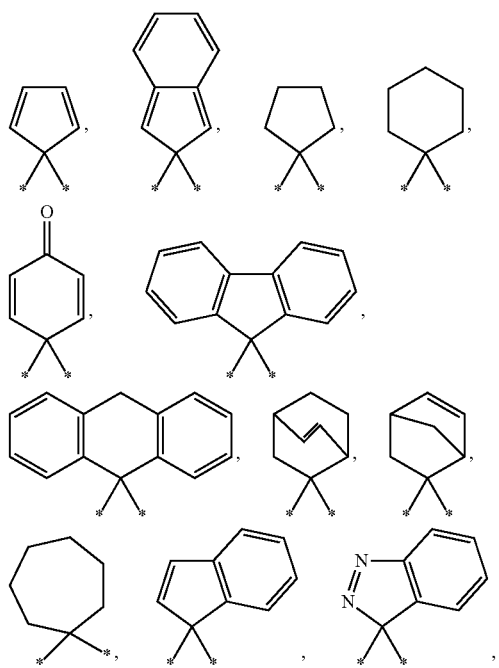

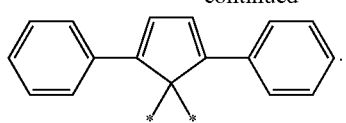

Particularly, in Chemical Formula 2, the $R^6$ and $R^7$ may be the same or different, and may be each independently selected from —$CF_3$, —$CCl_3$, —$CBr_3$, —$Cl_3$, —$NO_2$, —CN, a C1 to C2 alkanoyl group, or a C1 to C6 ester group. The C1 to C2 alkanoyl group may be —C(=O)$CH_3$, and the C1 to C6 ester group may be —$CO_2C_2H_5$.

Particularly, in above Chemical Formulae 1 and 2, $R^2$ and $R^5$ may be the same or different and may be each independently selected from the following chemical formulae.

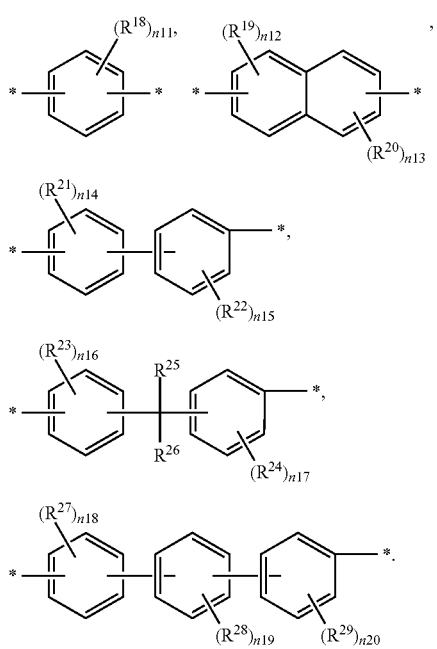

In the above chemical formulae, $R^{18}$ to $R^{29}$ are the same or different, and are each independently a halogen, a substituted or unsubstituted C1 to C10 aliphatic organic group, or a substituted or unsubstituted C6 to C20 aromatic organic group, n11 and n14 to n20 are each independently integers ranging from 0 to 4, and n12 and n13 are each independently integers ranging from 0 to 3.

More particularly, $R^2$ and $R^5$ may be the same or different and may be each independently selected from the following chemical formulae.

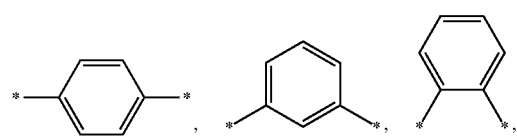

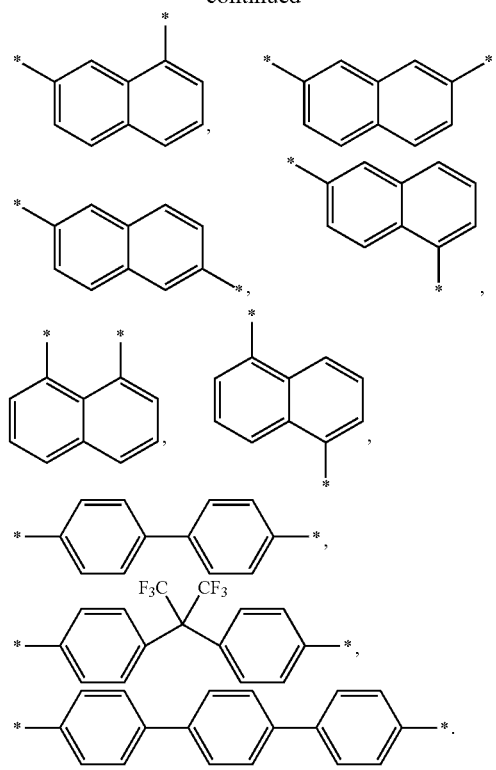

Particularly, the repeating unit represented by Chemical Formula 3 may include a repeating unit represented by following Chemical Formula 5, the repeating unit represented by Chemical Formula 6, or a repeating unit represented by a combination of Chemical Formula 5 and Chemical Formula 6.

Chemical Formula 5

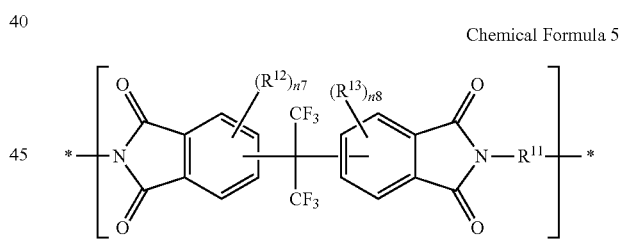

In Chemical Formula 5,
$R^{11}$, $R^{12}$, $R^{13}$, n7, and n8 are the same as described in the above Chemical Formula 3.

Chemical Formula 6

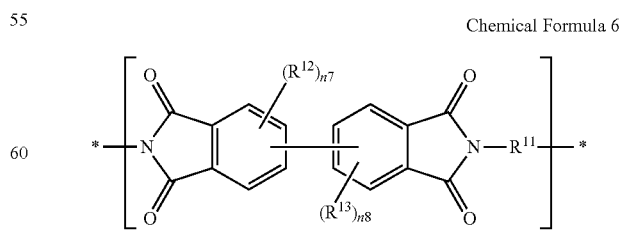

In Chemical Formula 6,
$R^{11}$, $R^{12}$, $R^{13}$, n7, and n8 are the same as described in the above Chemical Formula 3.

Particularly, the repeating unit represented by Chemical Formula 1 may include a repeating unit represented by the following Chemical Formula 7, a repeating unit represented by the following Chemical Formula 8, a repeating unit represented by the following Chemical Formula 9, or a combination thereof;

the repeating unit represented by Chemical Formula 2 may include a repeating unit represented by the following Chemical Formula 10, a repeating unit represented by the following Chemical Formula 11, a repeating unit represented by the following Chemical Formula 12, or a combination thereof; and the repeating unit represented by Chemical Formula 3 may include a repeating unit represented by the following Chemical Formula 13, a repeating unit represented by the following Chemical Formula 14, or a combination thereof.

Chemical Formula 7

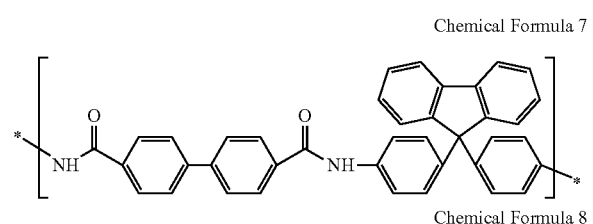

Chemical Formula 8

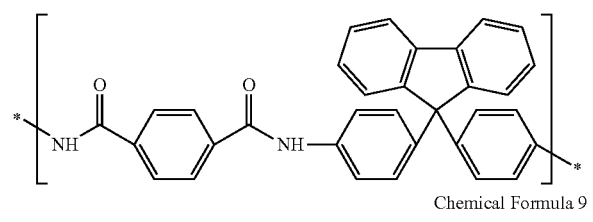

Chemical Formula 9

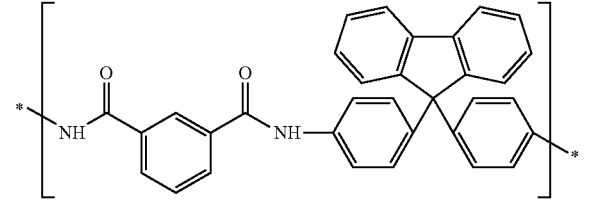

Chemical Formula 10

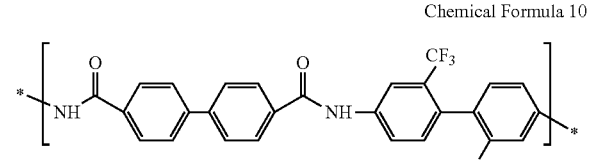

Chemical Formula 11

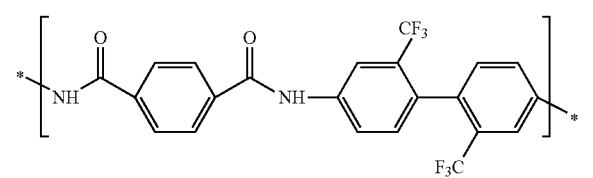

Chemical Formula 12

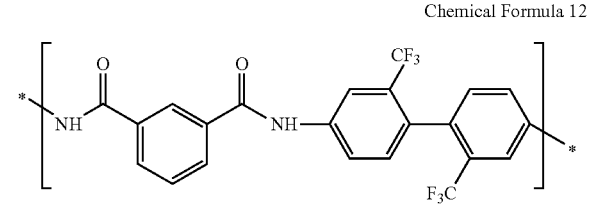

Chemical Formula 13

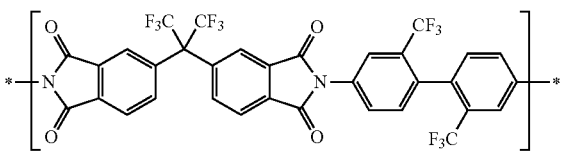

Chemical Formula 14

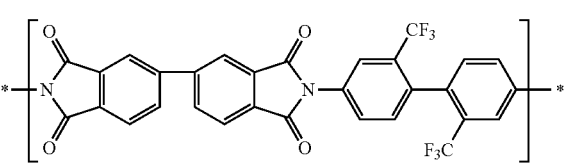

Meanwhile, the composition may be prepared by mixing and reacting the monomers of a diamine, a dianhydride, and a diamine having a pKa value of equal to or less than 3 at 25° C. in a reactor. In this case, the oligomers in the resulting composition may include a terminal end having an amino group at the terminal end and a terminal end having an anhydride group at the terminal end in about 1:1 in mole ratio, and the composition including the oligomers does not have any problem in storage.

Alternatively, if necessary, oligomers including a terminal end having an amino group at the terminal end, and oligomers including a terminal end having an anhydride group at the terminal end may be separately prepared, and mixed together to form the composition for use. In this case, the diamine having a pKa value of equal to or less than 3 at 25° C. may be added only to the oligomers including a terminal end having an amino group at the terminal end, and thus, at least a part of the oligomers including a terminal end having an amino group at the terminal end may be substituted with the diamine having a pKa value of equal to or less than 3 at 25° C.

In the meantime, when oligomers including a terminal end having an amino group at the terminal end and oligomers including a terminal end having an anhydride group at the terminal end are separately prepared and stored, if necessary, the oligomers including a terminal end having an anhydride group may be at least partially imidized before mixing with the oligomers including a terminal end having an amino group at the terminal end for being polymerized, which allows CTE of the resulting poly(imide-amide) copolymer to be lower.

When preparing the oligomers, it is possible to omit precipitation for removing HCl, which is produced as a by-product in a conventional process of preparing a poly(imide-amide) copolymer, by first preparing a diamine containing an amide group therein and reacting the diamine with a dianhydride. That is, as described in the examples in detail, a diamine and a dicarboxylic acid derivative are reacted to form a diamine containing an amide group therein, and the diamine is reacted with a dianhydride to form a poly(imide-amide) oligomer.

Particularly, in Synthesis Example 1, as depicted in Reaction Formula 2, 2'-bis(trifluoromethyl)benzidine is reacted with biphenyl dicarbonyl chloride in an aprotic solvent, N,N-dimethylacetamide to prepare a diamine named 'DA119'. Then, in the following examples, the resulting diamine, DA119, is reacted with a dianhydride and additional diamine to prepare a poly(imide-amide) copolymer. The diamine containing amide group may be represented by the following Chemical Formula 18.

Chemical Formula 18

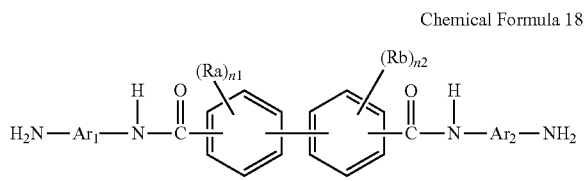

In the above Chemical Formula 18, the biphenylene group between two amide groups derives from biphenyl dicarbonyl chloride ("BPCI"), a dicarboxylic acid derivative, and $Ar_1$ and $Ar_2$, each linked between an amide group and an amino group at the end derives from TFDB, a diamine.

That is, as depicted in the above Chemical Formula 18, the diamine includes amide groups between two amine ends in the molecule, and thus, if the diamine is reacted with a dianhydride to prepare an 'imide', an '(imide-aramide) copolymer' is prepared, as well as an 'imide' is prepared, as the diamine includes 'aramide' structure therein. Therefore, there is no need for preparing 'aramide' during the process of preparing a poly(imide-aramide) copolymer, and thus, HCl, which is the by-product in a conventional process, is not produced. Accordingly, it is possible to omit precipitation process to remove HCl during the process of preparing a poly(imide-aramide) copolymer.

The diamine represented by the above Chemical Formula 18 may be prepared by using a conventional method of preparing an amide. For example, such as a low-temperature solution polymerization method, an interface polymerization method, a melt polymerization method, and a solid-phase polymerization method, but is not limited thereto.

According to another embodiment, provided is a method of preparing a poly(imide-amide) copolymer including polymerizing the above composition.

The method further includes curing the composition.

If necessary, oligomers including at least one terminal end having an amino group at the terminal end and oligomers including at least one terminal end having an anhydride group at the terminal end are separately prepared and stored, and then the oligomers may be mixed to prepare the composition before being polymerized. Further, when necessary, before being mixed, the oligomers including at least one terminal end having an anhydride group at the terminal end may be at least partially imidized. By partially or fully imidizing the oligomers including at least one terminal end having an anhydride, the resulting poly(imide-amide) copolymer may have a lowered CTE.

The poly(imide-amide) copolymer prepared by the above method has a low CTE, and is transparent, and thus, may be used for preparing an article required to be transparent and thermally stable. For example, the poly(imide-amide) copolymer may be used in preparing a substrate for display, particularly a substrate for flexible display, a touch panel, a protecting film for photo disc, etc.

Accordingly, according to another embodiment, provided is a poly(imide-amide) copolymer prepared from the composition according to the above embodiment.

The poly(imide-amide) copolymer may include
(i) at least one of a repeating unit represented by following Chemical Formula 1, a repeating unit represented by following Chemical Formula 2, and a combination thereof;
(ii) at least one selected from a repeating unit represented by following Chemical Formula 3, a repeating unit represented by following Chemical Formula 3A, and a combination thereof; and
(iii) at least one selected from a repeating unit represented by following Chemical Formula 15, a repeating unit represented by following Chemical Formula 15A and a combination thereof:

Chemical Formula 1

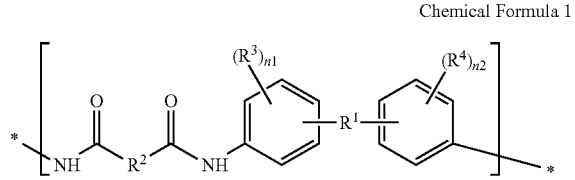

In Chemical Formula 1, $R^1$ is the same or different in each repeating unit, and is independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and is independently a substituted or unsubstituted C6 to C30 aromatic organic group, $R^3$ and $R^4$ are the same or different and are each independently a halogen, a hydroxy group, a substituted or unsubstituted C1 to C10 aliphatic organic group, a C6 to C20 aromatic organic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different, and are each independently hydrogen or a C1 to C10 aliphatic organic group, and n1 and n2 are independently integers ranging from 0 to 4.

Chemical Formula 2

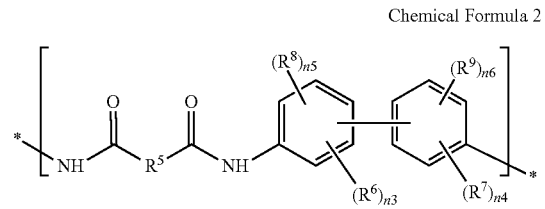

In Chemical Formula 2, $R^5$ is the same or different in each repeating unit, and is each independently a substituted or unsubstituted C6 to C30 aromatic organic group, $R^6$ and $R^7$ are the same or different and are each independently an electron withdrawing group, $R^8$ and $R^9$ are the same or different, and are each independently a halogen, a hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and are each independently hydrogen or a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3,
provided that n4+n6 is an integer ranging from 1 to 4.

Chemical Formula 3

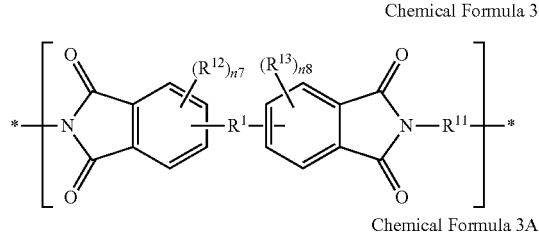

Chemical Formula 3A

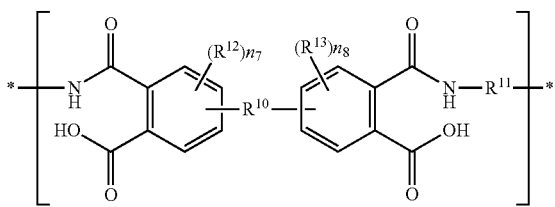

In Chemical Formulae 3 and 3A, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each repeating unit, and each independently includes a substituted or unsubstituted C6 to C30 aromatic organic group, wherein the aromatic organic group includes one aromatic ring, two or more aromatic rings fused together to provide a condensed ring system, or two or more moieties independently selected from one aromatic ring and two or more aromatic rings fused together to provide a condensed ring system, linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{209}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

Chemical Formula 15

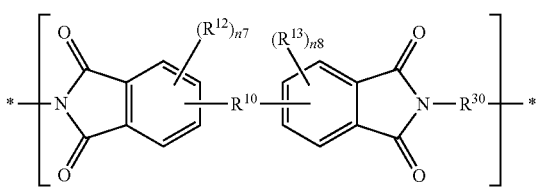

-continued

Chemical Formula 15A

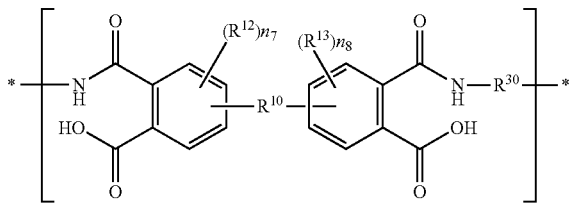

In Chemical Formulae 15 and 15A, $R^{10}$ is the same or different in each repeating unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{30}$ is the same or different in each repeating unit, and each independently includes a substituted or unsubstituted C6 to C30 aromatic organic group, wherein the aromatic organic group includes two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, and wherein if the two or more moieties are linked through a single bond, then each of the two or more moieties is substituted with one or more halogen, $R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{209}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3.

Particularly, the repeating unit represented by Chemical Formula 1 may include a repeating unit represented by following Chemical Formula 7, a repeating unit represented by the following Chemical Formula 8, a repeating unit represented by the following Chemical Formula 9, or a combination thereof;

the repeating unit represented by Chemical Formula 2 may include a repeating unit represented by following Chemical Formula 10, a repeating unit represented by the following Chemical Formula 11, a repeating unit represented by the following Chemical Formula 12, or a combination thereof;

the repeating unit represented by Chemical Formula 3 may include a repeating unit represented by following Chemical Formula 13, a repeating unit represented by the following Chemical Formula 14, or a combination thereof; and the repeating unit represented by Chemical Formula 15 may include a repeating unit represented by following Chemical Formula 16, a repeating unit represented by the following Chemical Formula 17, or a combination thereof.

Chemical Formula 7
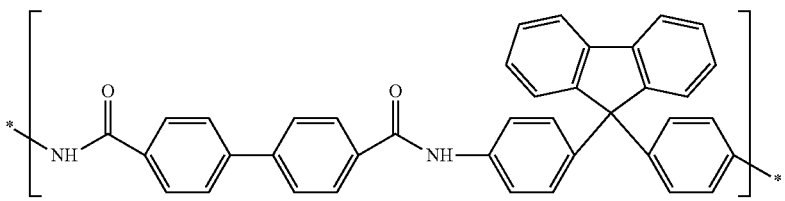
Chemical Formula 8
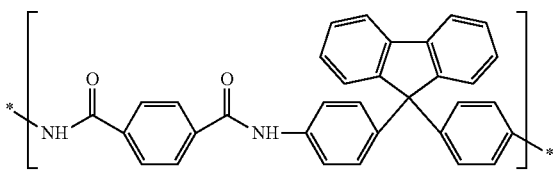
Chemical Formula 9
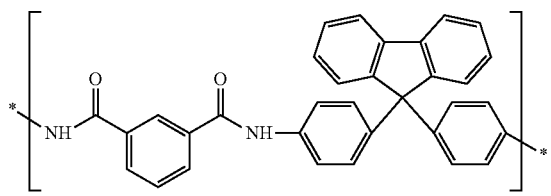
Chemical Formula 10
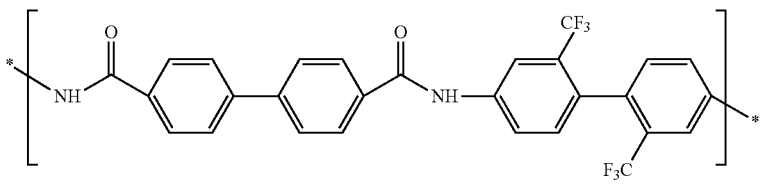
Chemical Formula 11
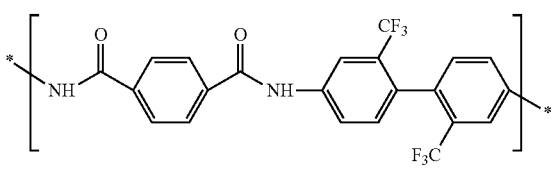
Chemical Formula 12
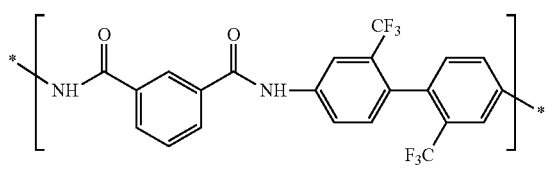
Chemical Formula 13
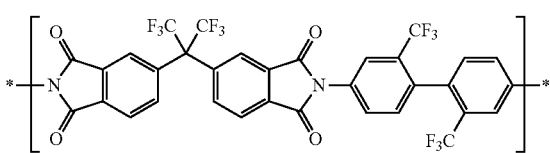
Chemical Formula 14
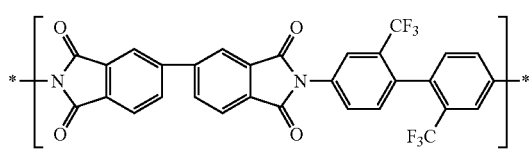
Chemical Formula 16
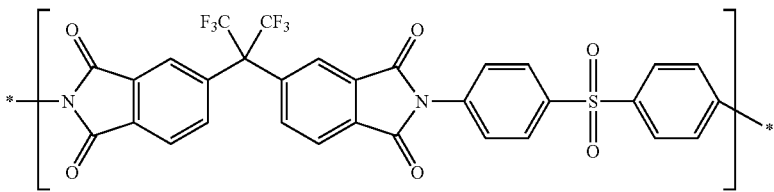
Chemical Formula 17
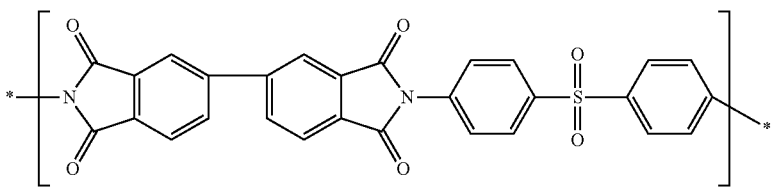

In an exemplary embodiment, a poly(imide-amide) copolymer includes
(i) a repeating unit represented by Chemical Formula 10,
(ii) a repeating unit represented by Chemical Formula 13, Chemical Formula 14, or a combination of Chemical Formula 13 and Chemical Formula 14, and
(iii) a repeating unit represented by Chemical Formula 16, Chemical Formula 17, or a combination of Chemical Formula 16 and Chemical Formula 17.

Particularly, the article may have light transmittance of from about 80% to about 90% in a wavelength range of 380 nanometers to 750 nanometers, and the article may have light transmittance of from about 55% to about 90% of a 400 nanometer wavelength.

The article may have a coefficient of thermal expansion ("CTE") of less than or equal to about 35 parts per million per degree Centigrade ("ppm/° C."). If the article has a CTE within the above range, it may have excellent heat resistance.

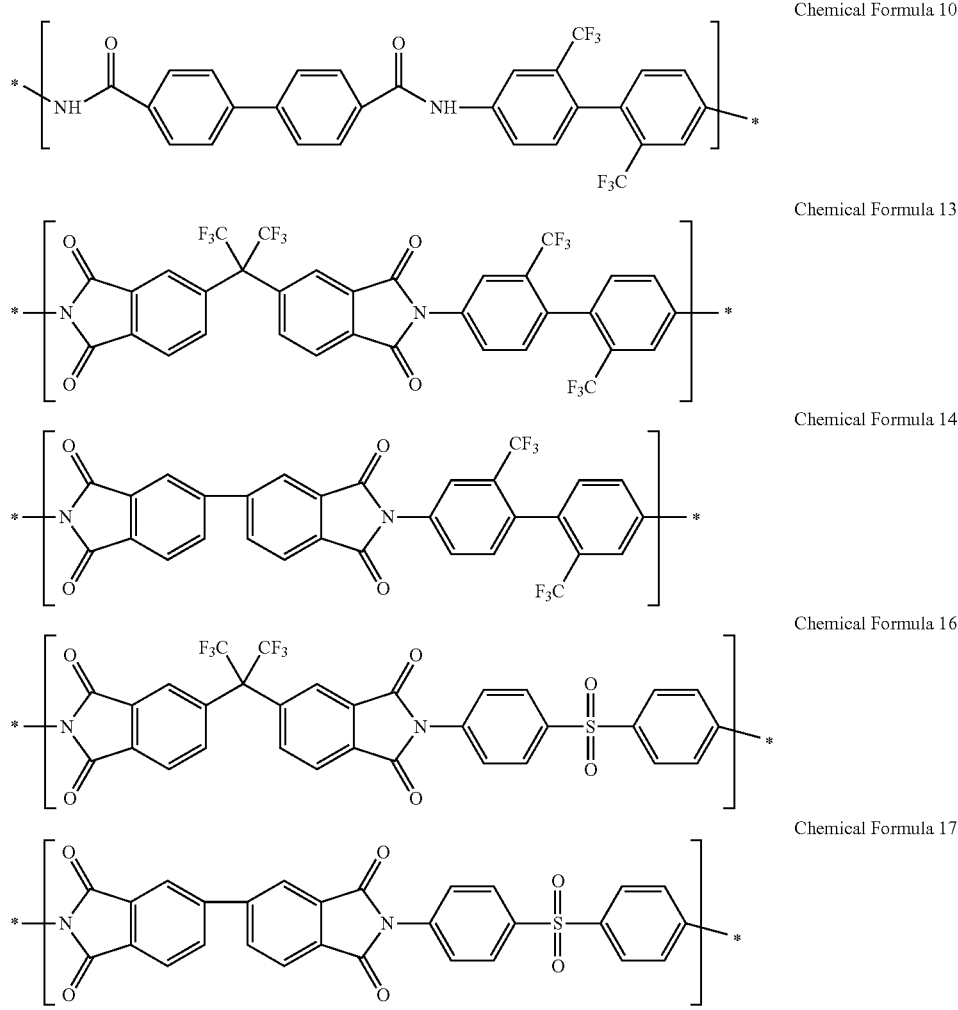

Chemical Formula 10

Chemical Formula 13

Chemical Formula 14

Chemical Formula 16

Chemical Formula 17

According to another embodiment, provided is an article including the poly(imide-amide) copolymer.

Particularly, the article may be a film, a fiber, a coating material, or an adhesive.

The article may be prepared according to the method of preparing a poly(imide-amide) copolymer.

For example, if the article is a film, the film may be prepared by coating the poly(imide-amide) composition on a substrate, and curing the same.

The article may have total light transmittance of greater than or equal to about 80% in a wavelength range of 380 nanometers to 750 nanometers, and the article may have light transmittance of greater than or equal to about 55% for light of a 400 nanometer wavelength. If an article including a poly(imide-amide) has light transmittance within the above range, the article may have good reproducibility for color.

Particularly, the article may have a coefficient of thermal expansion ("CTE") of less than or equal to about 25 ppm/° C., more particularly of less than or equal to about 15 ppm/° C.

The article may have a haze of less than or equal to about 5%. If the article has a haze within the above range, it may be sufficiently transparent and have excellent clarity. Particularly, the article may have a haze of less than or equal to about 3%.

The article may have a yellowness index ("YI") of less than or equal to about 10%. If the article has a yellowness index within the above range, it may be colorless and transparent. Particularly, the article may have from about 0.1% to about 5% of yellowness index.

The article including a poly(imide-amide) copolymer according to the above embodiment, for example, a film, may have a thickness of about 0.01 micrometers ("µm") to about 1,000 μm, but is not limited thereto, and may be appropriately controlled depending on its use.

The article may have excellent transparency, heat resistance, mechanical strength, and flexibility by including a poly(imide-amide) copolymer having excellent transparency, heat resistance, mechanical strength, and flexibility. Therefore, the article may be used as a substrate for a device, a substrate for display, an optical film, IC package, an adhesive film, multiple flexible printed circuit ("FRC"), a tape, a touch panel, a protecting film for a photo disc, etc.

According to yet another embodiment, provided is a display device including the article. Particularly, the display device may include an LCD (liquid crystal display device), an OLED (organic light emitting diode), etc., but is not limited thereto.

Among the display devices, an organic light emitting diode ("OLED") is described by referring to FIG. 1. FIG. 1 is a cross-sectional view of an organic light emitting diode ("OLED") in accordance with an embodiment.

Referring to FIG. 1, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article including the composite including the poly(amide-imide) copolymer and inorganic particles.

Hereafter, the technology of this disclosure is described in detail with reference to examples. The following examples and comparative examples are not restrictive but are illustrative.

EXAMPLES

Synthesis Example 1

Synthesis of a Diamine Monomer, DA119, Containing an Aramide Group

In order to prevent HCl from being produced during the process of preparing an amide, a diamine monomer containing an aramide group therein is first prepared and is used in the following process of preparing an oligomer or a polymer. The diamine monomer is named as 'DA119', and is prepared by following Reaction Scheme 2.

Reaction Scheme 2

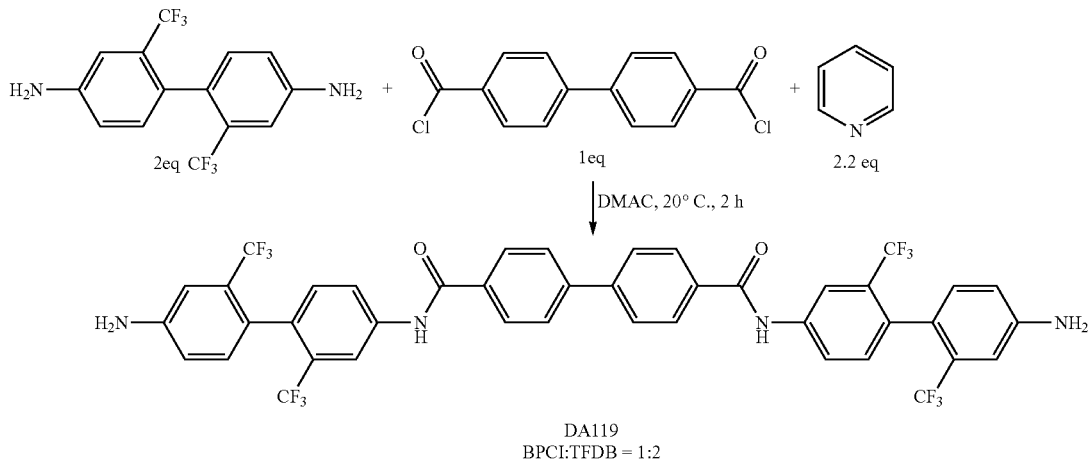

DA119
BPCI:TFDB = 1:2

In other words, the DA119 monomer corresponding to an amide unit is prepared by dissolving 2 mol equivalent (0.08 mol, 25.6192 g) of 2,2'-bis(trifluoromethyl)benzidine ("TFDB") and 2.2 mol equivalent (0.088 mol, 6.96 g) of pyridine in 800 g of N,N-dimethylacetamide as a solvent in a round-bottomed flask and washing the TFDB using 80 ml of DMAC. Next, 11.1648 g (1 mol equivalent, 0.04 mol) of BPCI (biphenyl dicarbonyl chloride) is divided into four portions and added one at a time (for a total of four additions) to the TFDB solution at 5° C. The mixture is vigorously agitated for 15 minutes.

The resulting solution is agitated under a nitrogen atmosphere for 2 hours, and then added to 7 L of water including 1 kg of NaCl. The mixture is cooled down to 0° C. The cooled mixture is maintained at 0° C. for 12 hours, completing precipitation of an organic material. The solid precipitate is filtered and then re-suspended four times with 1.5 L of deionized water and re-filtered. The filtered product is appropriately pressurized to remove as much water as possible therein and dried through a nitrogen stream until it has a constant weight. The pre-dried product is further maintained in a vacuum desiccator having sodium hydroxide and nitrogen atmosphere for 36 hours to remove water still remaining therein and dried at 90° C. under vacuum, obtaining the DA119 monomer described in the reaction scheme 2.

Example 1

Synthesis of a poly(imide-amide) (PAD-622)

6.414 g (0.0076 mol) of DA-119, prepared in Synthesis Example 1, was charged into a 250 ml 4-neck double walled reactor, preheated to 80° C. and equipped with a mechanical stirrer and a nitrogen inlet, and 57 ml of NMP was added. DA-119 solution was stirred at 80° C. under a nitrogen atmosphere until the monomer was completely dissolved. Then, 1.3952 g (0.0044 mol) of TFDB and 0.0604 g (0.0002 mol) of DADPS were added. Temperature was decreased to 20° C. Then, 1.6227 g (0.0037 mol) of 6FDA and 2.5077 g (0.0085 mol) of BPDA were slowly added to the diamines solution. 9 ml of NMP was added. Then, the solution was stirred for 48 hrs to obtain poly(amide-amic acid) solution. The content of DADPS is about 0.81% based on the total mole number of the reactants.

Example 2

Synthesis of a poly(imide-amide) (PAD-623)

6.3356 g (0.0075 mol) of DA-119, prepared in Synthesis Example 1, was charged into a 250 ml 4-neck double walled reactor, preheated to 80° C. and equipped with a mechanical stirrer and a nitrogen inlet, and 57 ml of NMP was added. DA-119 solution was stirred at 80° C. under a nitrogen atmosphere, until the monomer was completely dissolved. Then 1.3779 g (0.0043 mol) of TFDB and 0.1219 g (0.0005 mol) of DADPS were added. Temperature was decreased to 20° C. 1.6361 g (0.0037 mol) of 6FDA and 2.5285 g (0.0086 mol) of BPDA were slowly added to the diamines solution. 9 ml of NMP was added. Then the solution was stirred for 48 hrs to obtain a poly(amide-amic acid) solution. The content of DADPS is about 2.0% based on the total mole number of the reactants.

Example 3

Synthesis of a poly(imide-amide) (PAD-624)

6.2553 g (0.0074 mol) of DA-119, prepared in Synthesis Example 1, was charged into a 250 ml 4-neck double walled reactor, preheated to 80° C. and equipped with a mechanical stirrer and a nitrogen inlet, and 57 ml of NMP was added. DA-119 solution was stirred at 80° C. under nitrogen atmosphere, until the monomer was completely dissolved. Then 1.3607 g (0.0042 mol) of TFDB and 0.1844 g (0.0007 mol) of DADPS were added. Temperature was decreased to 20° C. 1.6499 g (0.0037 mol) of 6FDA and 2.5497 g (0.0087 mol) of BPDA were slowly added to the diamines solution. 9 ml of NMP was added. Then the solution was stirred for 48 hrs to obtain a poly(amide-amic acid) solution. The content of DADPS is about 2.8% based on the total mole number of the reactants.

Synthesis Example 2

Synthesis of an oligo(imide-amide) Including a Terminal End Having an Amine (PAD-625)

6.0833 g (0.00718 mol) of DA-119, prepared in Synthesis Example 1, was charged into a 250 ml 4-neck double walled reactor, preheated to 80° C. and equipped with a mechanical stirrer and a nitrogen inlet, and 54 ml of NMP was added. DA-119 solution was stirred at 80° C. under nitrogen atmosphere, until the monomer was completely dissolved. Then 3.0109 g (0.0094 mol) of TFDB and 0.2419 g (0.00097 mol) of DADPS were added. Temperature was decreased to 20° C. 1.9894 g (0.0045 mol) of 6FDA and 3.0744 g (0.01045 mol) of BPDA were slowly added to the diamines solution. 10 ml of NMP was added. Then the solution was stirred for 48 hrs to obtain oligo(amide-amic acid) solution.

Synthesis Example 3

Synthesis of an Amine-Terminated oligo(imide-amide) (PAD-636)

6.5493 g (0.0077 mol) of DA-119, prepared in Synthesis Example 1, was charged into a 250 ml 4-neck double walled reactor, preheated to 80° C. and equipped with a mechanical stirrer and a nitrogen inlet, and 54 ml of NMP was added. DA-119 solution was stirred at 80° C. under nitrogen atmosphere until the monomer was completely dissolved. Then 1.5846 g (0.0049 mol) of TFDB and 1.2086 g (0.0049 mol) of DADPS were added. Temperature was decreased to 20° C. 1.9877 g (0.0045 mol) of 6FDA and 3.0718 g (0.0104 mol) of BPDA were slowly added to the diamines solution. 10 ml of NMP was added. Then the solution was stirred for 48 hrs to obtain amine terminated oligo(amide-amic acid) solution.

Synthesis Example 4

Synthesis of Amine-Terminated oligo(imide-amide) (PAD-639)

6.4813 g (0.0077 mol) of DA-119, prepared in Synthesis Example 1, was charged into a 250 ml 4-neck double walled reactor, preheated to 80° C. and equipped with a mechanical stirrer and a nitrogen inlet, and 54 ml of NMP was added. DA-119 solution was stirred at 80° C. under a nitrogen atmosphere until the monomer was completely dissolved. Then 2.2345 g (0.0070 mol) of TFDB and 0.6777 g (0.0027 mol) of DADPS were added. Temperature was decreased to 20° C. 10.9669 g (0.0044 mol) of 6FDA and 3.0396 g (0.0103 mol) of BPDA were slowly added to the diamines solution. 10 ml of NMP was added. Then the solution was stirred for 48 hours (hrs) to obtain amine terminated oligo(amide-amic acid) solution.

Synthesis Example 5

Synthesis of Anhydride-Terminated oligo(imide-amide) (PAD-637)

7.4014 g (0.0087 mol) of DA-119, prepared in Synthesis Example 1, was charged into a 250 ml 4-neck double walled reactor, preheated to 80° C. and equipped with a mechanical stirrer and a nitrogen inlet, and 40 ml of NMP and 17 ml of Equamide M100 were added. DA-119 solution was stirred at 80° C. under nitrogen atmosphere, until the monomer was completely dissolved. Then TFDB, 1.8331 g (0.0057 mol) was added. Temperature was decreased to 20° C. 2.0294 g (0.0046 mol) of 6FDA and 3.1362 g (0.0107 mol) of BPDA were slowly added to the diamines solution. 7 ml of Equamide M100 was added. Then solution was stirred for 48 hrs to obtain anhydride terminated oligo(amide-amic acid) solution.

In order to chemically imidize the anhydride-terminated oligomer, 2.9537 g (0.0289 mol) of acetic anhydride was added. After stirring for 30 min, 2.2885 g (0.0289 mol) of pyridine was added, and reaction was carried out for additional 24 hrs.

Examples 4 and 5: Synthesis of a poly(imide-amide) copolymer by copolymerization of an amine-terminated oligomer and an anhydride-terminated oligomer 10 g of PAD-637-100% Cl (100% chemically imidized) solution prepared in Synthesis Example 5 was charged into a glass vial, and 2.7148 g of PAD-636 solution prepared in Synthesis Example 3 was added thereto. The solution was mechanically stirred, and left at room temperature to form a poly(imide-amide) copolymer having a composition described in the below table 1. The content of DADPS was about 3.6% based on the total mole number of the reactants (Example 4).

Further, 10 g of PAD-637-100% Cl (100% chemically imidized) solution prepared in Synthesis Example 5 was charged into a glass vial, and 2.7436 g of PAD-639 solution prepared in Synthesis Example 4 was added thereto. The solution was mechanically stirred, and left at room temperature to form a poly(imide-amide) copolymer having a composition described in the below table 1. The content of DADPS was about 2.0% based on the total mole number of the reactants (Example 5).

Comparative Example 1

Synthesis of a poly(imide-amide)

6.498 g (0.0077 mol) of DA-119, prepared in Synthesis Example 1, was charged into a 250 ml 4-neck double walled reactor, preheated to 80° C. and equipped with a mechanical stirrer and a nitrogen inlet, and 57 ml NMP was added. DA-119 solution was stirred at 80° C. under nitrogen atmosphere until the monomer was completely dissolved, and then TFDB, 1.4269 g (0.0045 mol) was added. Temperature was decreased to 20° C. Then, 1.6227 g (0.0037 mol) of 6FDA and 2.5077 g (0.0085 mol) of BPDA were slowly added to the diamines solution. 9 ml of NMP was added. Then, the solution was stirred for 48 hrs to obtain a poly(amide-amic acid) solution.

Experimental Example

1. Evaluation of Storage Stability of a Copolymer

In order to evaluate storage stability, viscosity of the compositions according to the examples and comparative examples are measured when they are stored at room temperature and in a refrigerator, respectively. Increase of viscosity means that the oligomers react to form a polymer of a higher molecular weight. Viscosity is measured by using a cone (diameter: 40 mm, angle: 2°) and a plate type AR rheometer.

Figure 2:
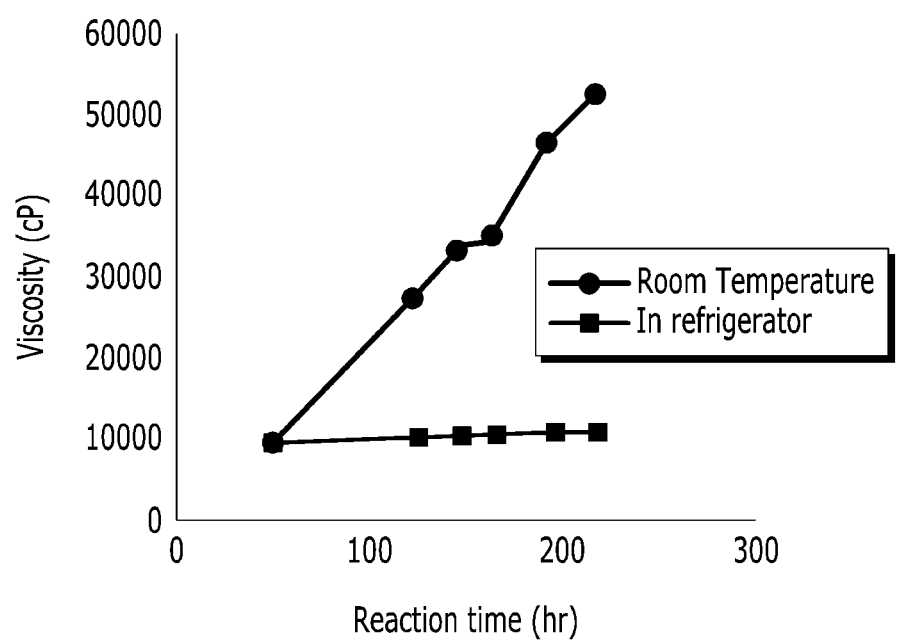
FIGS. 2 to 4 are graphs of viscosity (centipoise, cP) versus reaction time (hour, h) showing viscosity changes of the copolymers according to Examples 1 to 3 respectively, depending on time, in which each copolymer is stored in a refrigerator, and is present at room temperature.
Figure 3:
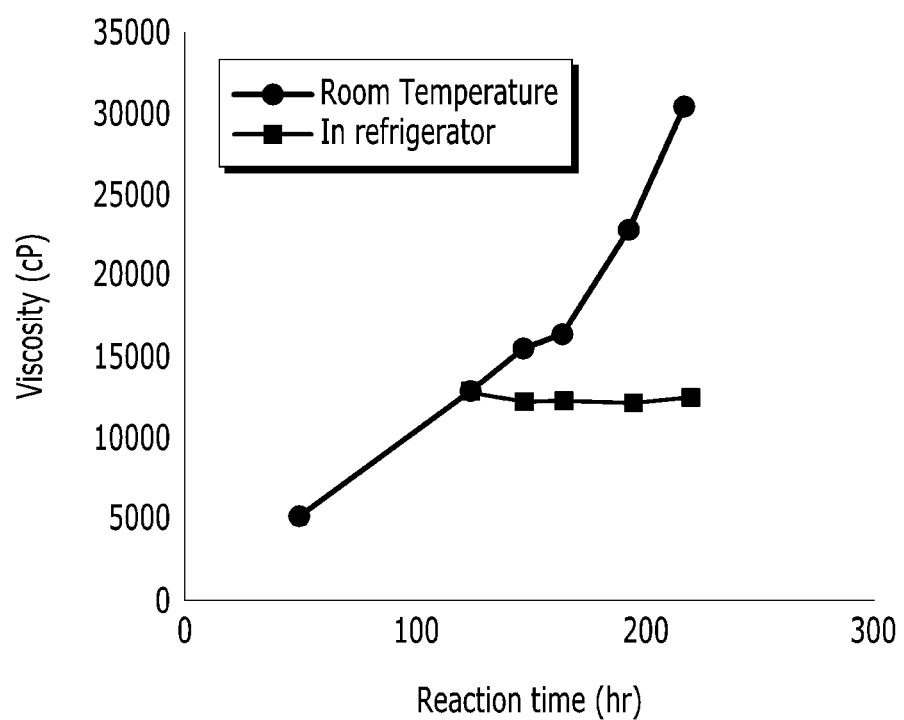
Figure 4:
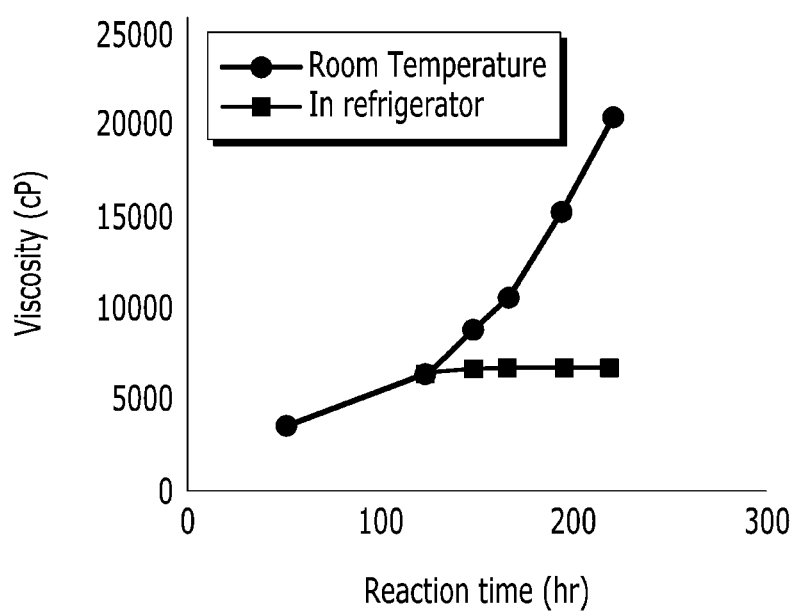

As shown from FIG. 2 to FIG. 4, compositions according to Examples 1 to 3, which includes oligomers including a terminal end having DADPAS, which is a diamine having pKa value of less than 3 at amount of about 0.81%, 2%, and 2.8% based on the total mole number of the monomers, respectively, hardly shows viscosity increase when stored at temperature of −12° C. in a refrigerator for more than about 200 hours. When the same compositions, however, are stored at room temperature, as shown from FIG. 3 to FIG. 5, viscosity of the compositions rapidly increase right after the storage, and after 50 hours, viscosity reaches above 100,000 centipoise ("cP"), which means that the compositions cannot be applied by spin-coating.

Figure 5:
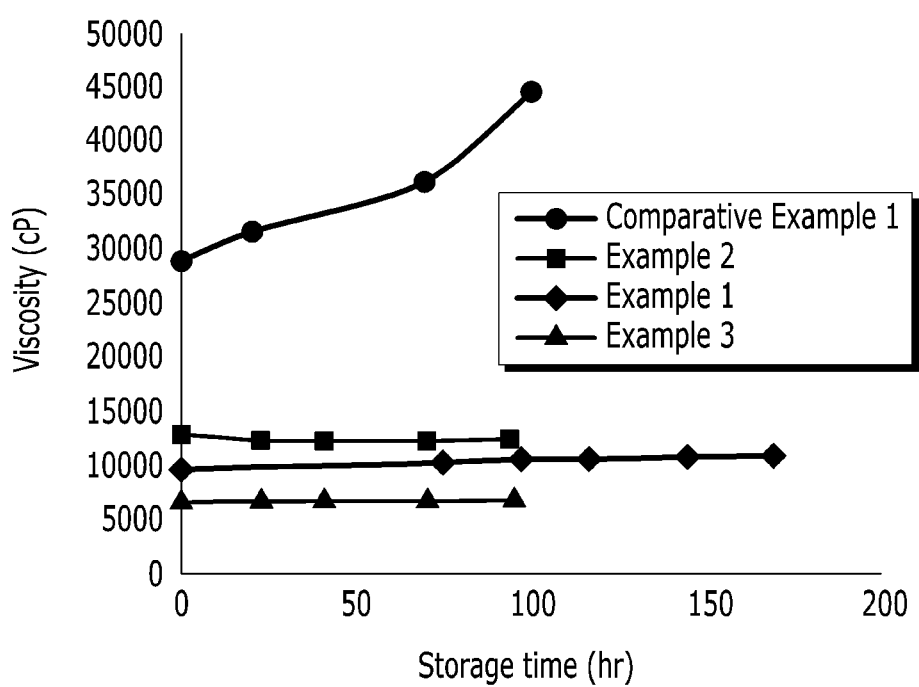
FIG. 5 shows graphs of viscosity (centipoise, cP) versus storage time (hour, h) showing viscosity changes of the copolymers according to Examples 1 to 3 and Comparative Example 1 depending on time, wherein the copolymers are stored in a refrigerator.

Further, as shown from FIG. 5, when the copolymers according to Examples 1 to 3, and the copolymer according to Comparative Example 1, which does not include a terminal end having DADPS, are stored at temperature of −12° C. in a refrigerator, compositions according to Examples 1 to 3, which includes oligomers including a terminal end having DADPAS, which is a diamine having pKa value of less than 3, hardly shows increase of viscosity for more than about 100 hours, while the compositions according to Comparative Example 1 shows increase of viscosity to above 30,000 cP right after the storage, and after 50 hours, shows more rapid increase of viscosity, even when stored in a refrigerator, which means that the composition cannot be applied by spin-coating. On the contrary, the compositions according to Examples 1 to 3 maintain viscosity within the range of about 5,000 cP to about 15,000 cP, which means that the compositions can be applied in low viscosity coating. Particularly, the higher the content of DADPS, the lower the viscosity maintains, and thus, the composition according to Example 3 maintains about 10,000 cP of viscosity for more than 100 hours.

Figure 6:
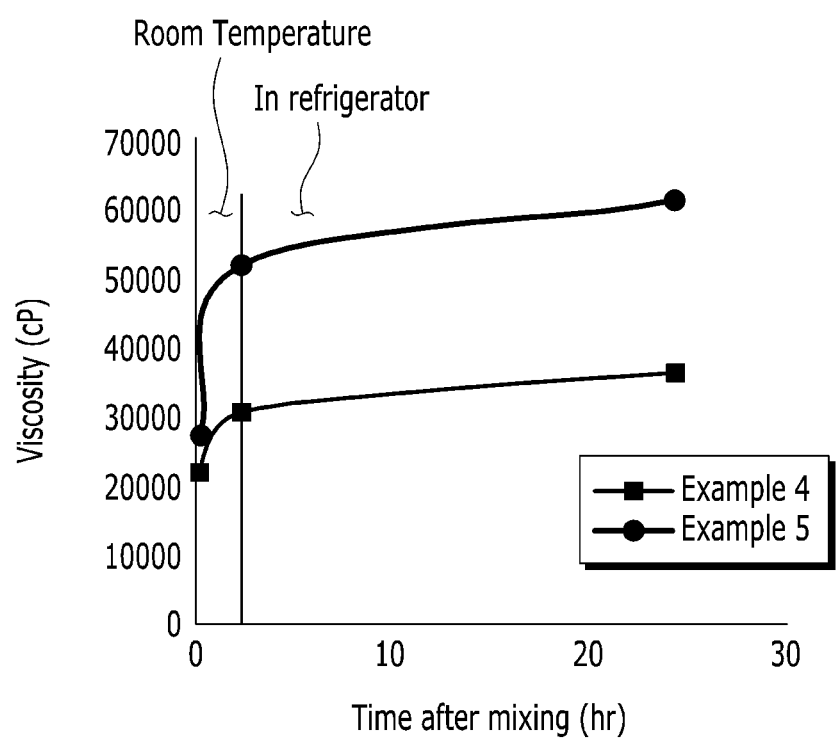
FIG. 6 shows graphs of viscosity (centipoise, cP) versus time after mixing (hour, h) showing viscosity changes of the copolymers according to Examples 4 and 5 depending on time after mixing oligomers according to Synthesis Examples 3 and 5 to prepare the copolymer according to Example 4, and mixing oligomers according to Preparative Examples 4 and 5 to prepare the copolymer according to Example 5, wherein the copolymers are stored in a refrigerator after mixing the oligomers.

FIG. 6 shows viscosity changes of the copolymers according to Examples 4 and 5 as time passes, after mixing oligomers at room temperature and the copolymers resulting therefrom are stored at temperature of −12° C. in a refrigerator. The copolymer according to Example 4 is prepared by polymerizing oligomers according to Synthesis Examples 3 and 5, and the copolymer according to Example 5 is prepared by polymerizing oligomers according to Synthesis Examples 4 and 6. As shown from FIG. 6, the copolymers according to Examples 4 and 5 show rapid increase of viscosity for about 2 hours right after mixing the oligomers to prepare the copolymers at room temperature, but hardly show changes in viscosity, once the polymerization reaction finish at a certain degree. That is, when at least a part of the oligomers including a terminal end having an amino group at the terminal end includes a diamine having a pKa value of equal to or less than 3 at the terminal end, such as DADPS, even when the oligomers including a terminal end having an amino group at the terminal end and the oligomers including a terminal end having an anhydride group are mixed together, viscosity of the mixture hardly increases in a refrigerator, as polymerization is inhibited.

Figure 7:
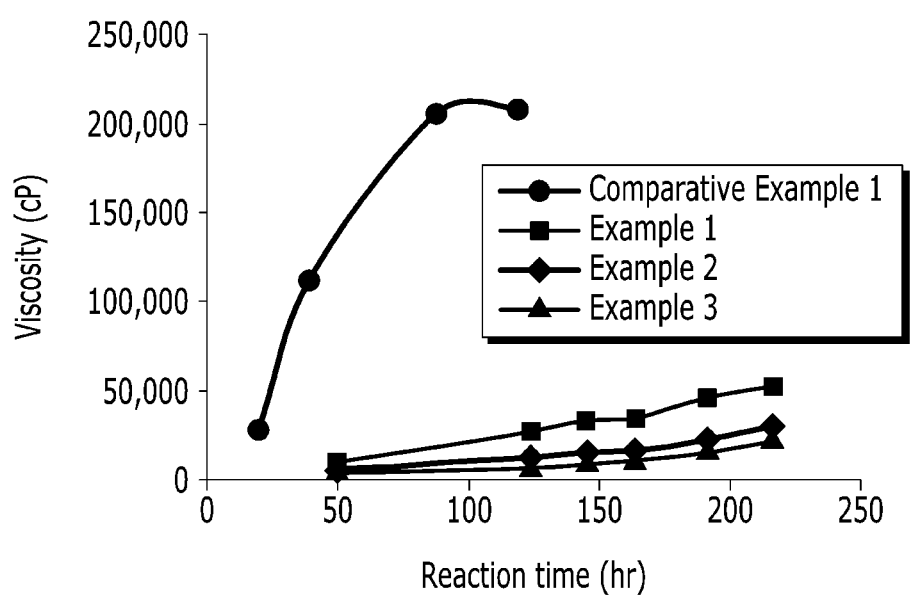
FIG. 7 shows graphs of viscosity (centipoise, cP) versus reaction time (hour, h) showing viscosity changes of the polyimide prepared by imidization of the copolymers according to Examples 1 to 3 and Comparative Example 1 depending on time.

FIG. 7 shows viscosity changes depending upon time, when each of the copolymers according to Examples 1 to 3 and Comparative Example 1 is polymerized to form polyimide at room temperature. The more the viscosity increases for the same time, the faster the polymerization proceeds. As shown from FIG. 7, when including a little amount of DADPS, a diamine having a pKa value of less than 3, polymerization rate drastically reduces, compared to the polymerization reaction of the copolymers according to Comparative Example 1, which does not include DADPS. Particularly, viscosity maintains at low values as the content of DADPS increases, which indicates that the low reactivity of DADPS advantageously affect to the storage stability.

From the results above, if at least a part of the oligomers including a terminal end having an amino group at the terminal end includes a diamine having a pKa value of equal to or less than 3 at 25° C., even when oligomers including a terminal end having an amino group at the terminal end and oligomers including a terminal end having an anhydride group at the terminal end are present in a mole ratio of about 1:1, the composition including the mixture of the oligomers is able to be stored in a refrigerator for a long time without increasing viscosity, and thus, is available for spin-coating to easily prepare a poly(imide-amide) copolymer having excellent optical properties by further polymerization and curing.

2. Performance Evaluation of Film

Synthesis of Film

The copolymers according to the examples and comparative examples are coated on a glass substrate (5×5 cm) by using a spin-coater at a rate of 800 rounds per minute ("rpm"). The coating solution is previously dried on a hot plate of 80° C. for 1 hour to evaporate excess solvent. The glass substrate is heated at a rate of 3 degrees Centigrade per minute ("° C./min") in $N_2$ atmosphere, and the film is fabricated by annealing at 320° C. for 1 hour.

Optical Properties

The film is evaluated regarding optical properties using a spectrophotometer (CM3600d, Konica Minolta) on the transmittance opacity/haze mode. Spectra of the film are recorded for from 360 nanometers ("nm") to 700 nm wavelength region. The results are in Table 1 below.

Coefficient of Thermal Expansion and Thermal Properties

CTE of a film is measured using TMA Q400 (TA Instruments, USA). Specifically, the CTE is measured with a fixed tension force of 0.05 Newton ("N"), in the temperature range of 50° C. to 400° C. at a heating rate of 5° C./min. CTE values are determined as the dimension changes within the temperature range of 50° C. to 250° C. The results are in Table 1 below.

TABLE 1

| | Thickness of film (μm) | Transparency (%) | Transparency @ 430 nm (%) | Haze (%) | Yellowness Index (%) | CTE (ppm/° C.) (50~250° C.) | Glass Transition Temperature (Tg)(° C.) |
|---|---|---|---|---|---|---|---|
| Example 1 | 10 | 88.03 | 83.77 | 0.34 | 3.36 | 16.78 | 346 |
| Example 2 | 10 | 88.1 | 83.44 | 0.36 | 3.64 | 18.86 | 353 |
| Example 3 | 12 | 87.59 | 81.97 | 0.34 | 4.54 | 20.15 | 352 |
| Example 4 | 14 | 87.78 | 83.92 | 0.49 | 3.16 | 17.77 | 352 |
| Example 5 | 11 | 87.86 | 84.1 | 0.41 | 3.02 | 17.66 | 335 |
| Comparative Example 1 | 11 | 87.68 | 83.28 | 0.81 | 3.56 | 18.83 | 354 |

As shown from Table 1 above, the film fabricated by using a poly(imide-amide) copolymer according to an embodiment has excellent optical performance, such as, high transparency, low haze, yellowness index, etc., and improved thermal performance, such as low CTE, as well as high glass transition temperature ("Tg").

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition comprising a plurality of oligomers, each oligomer comprising
    (i) a structural unit selected from a structural unit represented by Chemical Formula 1, a structural unit represented by Chemical Formula 2, and a combination thereof; and
    (ii) a structural unit selected from a structural unit represented by Chemical Formula 3, a structural unit represented by Chemical Formula 3A, and a combination thereof;
wherein at least one of the oligomers comprises at least one terminal amino group ($-NH_2$), and
wherein the at least one terminal amino group ($-NH_2$) is derived from a diamine having a pKa value of equal to or less than 3 at 25° C.:

Chemical Formula 1

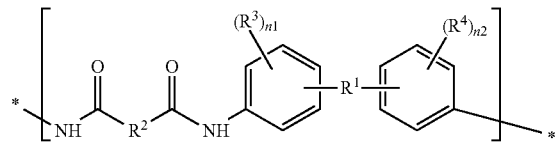

wherein, in Chemical Formula 1,
R$^1$ is the same or different in each structural unit, and is each independently a C3 to C30 alicyclic organic group, a C6 to C30 aromatic organic group, or a C2 to C30 heterocyclic group
R$^2$ is the same or different in each structural unit, and is each independently a C6 to C30 aromatic organic group,
R$^3$ and R$^4$ are the same or different and are each independently a halogen, a hydroxy group, a C1 to C10 aliphatic organic group, a C6 to C20 aromatic organic group, an alkoxy group of formula $-OR^{200}$ (wherein R$^{200}$ is a C1 to C10 aliphatic organic group), or a silyl group of formula $-SiR^{201}R^{202}R^{203}$ (wherein R$^{201}$, R$^{202}$, and R$^{203}$ are the same or different, and are each independently hydrogen or a C1 to C10 aliphatic organic group), and n1 and n2 are each independently integers ranging from 0 to 4, Chemical Formula 2

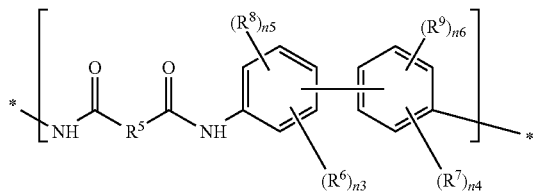

wherein, in Chemical Formula 2,
$R^5$ is the same or different in each structural unit, and is each independently a C6 to C30 aromatic organic group,
$R^6$ and $R^7$ are the same or different and are each independently —$CF_3$, —$CCl_3$, —$CBr_3$, —$Cl_3$, —$NO_2$, —CN, a C1 to C2 alkanoyl group, or a C1 to C6 ester group,
$R^8$ and $R^9$ are the same or different, and are each independently a halogen, a hydroxy group, a C1 to C10 aliphatic organic group, a C6 to C20 aromatic organic group, an alkoxy group of formula —$OR^{204}$ (wherein $R^{204}$ is a C1 to C10 aliphatic organic group), or a silyl group of formula —$SiR^{205}R^{206}R^{207}$ (wherein $R^{205}$, $R^{206}$, and $R^{207}$ are the same or different, and are each independently hydrogen or a C1 to C10 aliphatic organic group),
n3 is an integer ranging from 1 to 4,
n5 is an integer ranging from 0 to 3,
provided that n3+n5 is an integer ranging from 1 to 4,
n4 is an integer ranging from 1 to 4,
n6 is an integer ranging from 0 to 3,
provided that n4+n6 is an integer ranging from 1 to 4, Chemical Formula 3

Chemical Formula 3A wherein, in Chemical Formulae 3 and 3A,
$R^{10}$ is the same or different in each structural unit, and is each independently a single bond, a C1 to C30 aliphatic organic group, a C3 to C30 alicyclic organic group, a C6 to C30 aromatic organic group, or a C2 to C30 heterocyclic group,
$R^{11}$ is the same or different in each structural unit, and each independently comprises a C6 to C30 aromatic organic group, wherein the aromatic organic group comprises one aromatic ring, two or more aromatic rings fused together to provide a condensed ring system, or a combination of two or more aromatic rings linked through a single bond or through a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and C(=O)NH—, or a combination thereof,
$R^{12}$ and $R^{13}$ are the same or different, and are each independently a halogen, a hydroxy group, a C1 to C10 aliphatic organic group, a C6 to C20 aromatic organic group, an alkoxy group of formula —$OR^{208}$ (wherein $R^{208}$ is a C1 to C10 aliphatic organic group), or a silyl group of formula —$SiR^{209}R^{210}R^{211}$ (wherein $R^{209}$, $R^{210}$, and $R^{211}$ are the same or different, and are each independently hydrogen or a C1 to C10 aliphatic organic group), and
n7 and n8 are each independently integers ranging from 0 to 3.

2. The composition according to claim 1, wherein the diamine having a pKa value of equal to or less than 3 at 25° C. is represented by Chemical Formula 4:

Chemical Formula 4

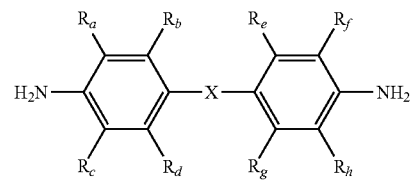

wherein, in Chemical Formula 4,
X is a single bond, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(=O)NH—, —C(CF$_3$)$_2$—, —C(CCl$_3$)$_2$—, —C(CBr$_3$)$_2$—, or —C(Cl$_3$)$_2$—,
$R_a$ to $R_h$ are the same or different, and are each independently a halogen, a hydroxy group, a C1 to C10 aliphatic organic group, a C6 to C20 aromatic organic group, an alkoxy group of formula —$OR^{208}$ (wherein $R^{208}$ is a C1 to C10 aliphatic organic group), or a silyl group of formula —$SiR^{209}R^{210}R^{211}$ (wherein $R^{209}$, $R^{210}$, and $R^{211}$ are the same or different, and are each independently hydrogen or a C1 to C10 aliphatic organic group),
provided that when X is a single bond, two or more of $R_a$ to $R_d$ and two or more or $R_e$ to $R_h$ are not hydrogen.

3. The composition according to claim 1, wherein the diamine having a pKa value of equal to or less than 3 at 25° C. is represented by one or more of Chemical Formula c to Chemical Formula h:

Chemical Formula c

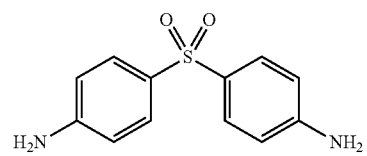

Chemical Formula d

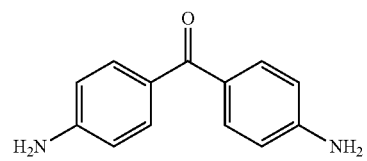

-continued

Chemical Formula e

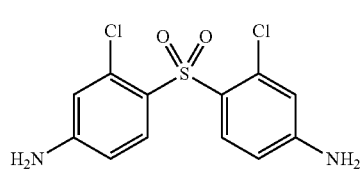

Chemical Formula f

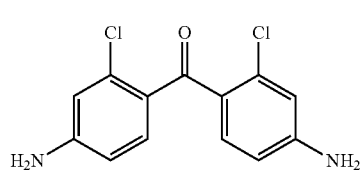

Chemical Formula g

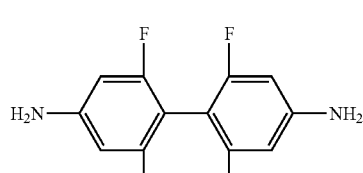

Chemical Formula h

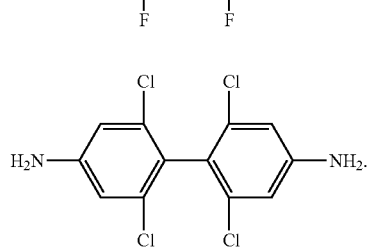

4. The composition according to claim 1, comprising an oligomer comprising two terminal ends and further comprising an anhydride group disposed at each of the two terminal ends, an oligomer comprising two terminal ends and further comprising an amino group (—$NH_2$) disposed at each of the two terminal ends, and an oligomer comprising two terminal ends and further comprising an amino group (—$NH_2$) disposed at one terminal end and an anhydride group disposed at the other terminal end, wherein the ratio between the total mole number of the anhydride group disposed at the terminal ends and the total mole number of the amino group (—$NH_2$) disposed at the terminal ends is about 1:1.

5. The composition according to claim 1, comprising an oligomer comprising two terminal ends and further comprising an anhydride group disposed at each of the two terminal ends, and an oligomer comprising two terminal ends and further comprising an amino group disposed at each of the two terminal ends, wherein the ratio between the total mole number of the anhydride group disposed at the terminal ends and the total mole number of the amino group disposed at the terminal ends is about 1:1.

6. The composition according to claim 1, wherein the diamine having a pKa value of equal to or less than 3 at 25° C. is present in an amount of equal to or less than about 30 mole % based on the total mole number of the structural units contained in the plurality of oligomers in the composition.

7. The composition according to claim 1, wherein each oligomer in the composition has a weight average molecular weight of about 10,000 gram/mole to about 20,000 gram/mole.

8. The composition according to claim 1, wherein each oligomer comprises about 1 to 1,000 of each of the structural units represented by Chemical Formula 1, Chemical Formula 2, or a combination of Chemical Formula 1 and Chemical Formula 2; and the structural unit represented by the Chemical Formula 3.

9. The composition according to claim 1, wherein $R^1$ is selected from the chemical formulae:

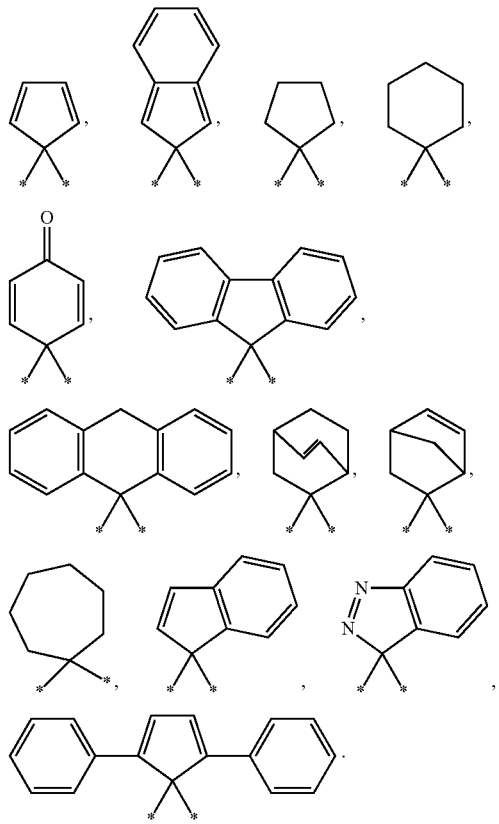

10. The composition according to claim 1, wherein $R^2$ and $R^5$ are the same or different and are each independently selected from the chemical formulae:

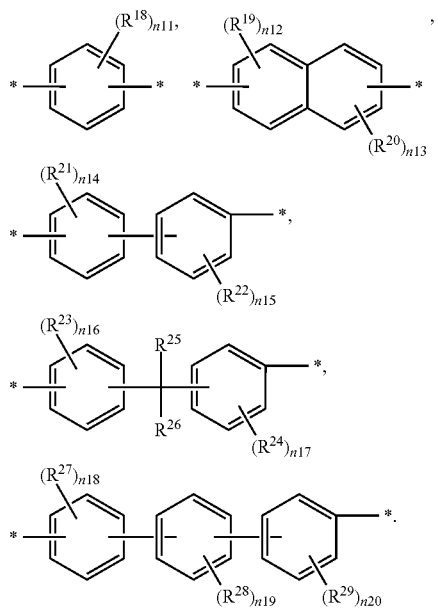

wherein, in the chemical formulae,

R[18] to R[29] are the same or different, and are each independently a halogen, a C1 to C10 aliphatic organic group, or a C6 to C20 aromatic organic group, n11 and n14 to n20 are each independently integers ranging from 0 to 4, and n12 and n13 are each independently integers ranging from 0 to 3.

11. The composition according to claim 10, wherein $R^2$ and $R^5$ are the same or different and are each independently selected from chemical formulae:

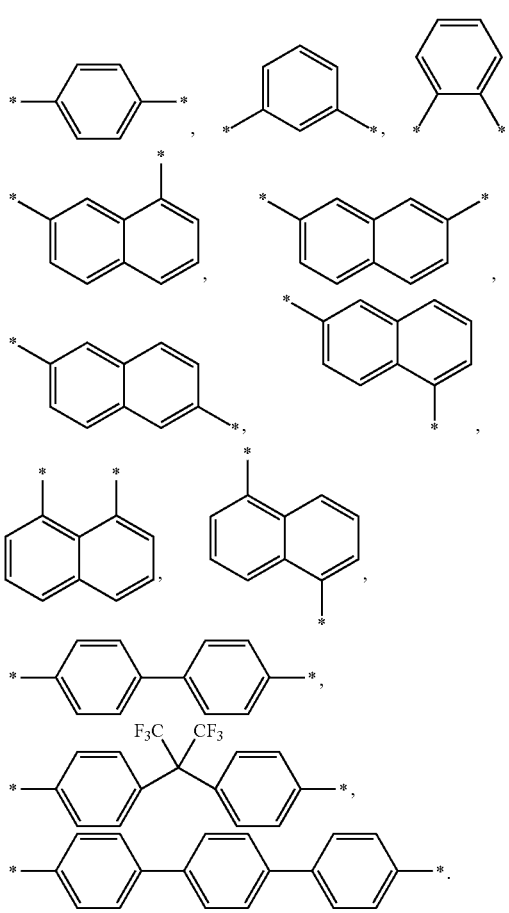

12. The composition according to claim 1, wherein the structural unit represented by the Chemical Formula 3 comprises a structural unit represented by Chemical Formula 5, a structural unit represented by Chemical Formula 6, or a combination of structural units represented by Chemical Formula 5 and Chemical Formula 6:

Chemical Formula 5

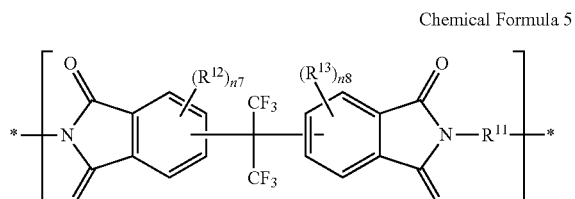

Chemical Formula 6

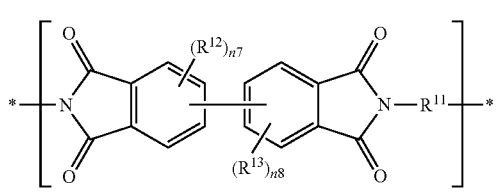

wherein, in Chemical Formulae 5 and 6, $R^{11}$ is the same or different in each structural unit, and each independently comprises a C6 to C30 aromatic organic group, wherein the aromatic organic group comprises one aromatic ring, two or more aromatic rings fused together to provide a condensed ring system, or a combination of two or more aromatic rings linked through a single bond or through a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, or a combination thereof, $R^{12}$ and $R^{13}$ are the same or different, and are each independently a halogen, a hydroxy group, a C1 to C10 aliphatic organic group, a C6 to C20 aromatic organic group, an alkoxy group of formula —OR$^{208}$ (wherein R$^{208}$ is a C1 to C10 aliphatic organic group), or a silyl group of formula —SiR$^{209}$R$^{210}$R$^{211}$ (wherein R$^{209}$, R$^{210}$, and R$^{211}$ are the same or different, and are each independently hydrogen or a C1 to C10 aliphatic organic group), and n7 and n8 is each independently integers ranging from 0 to 3.

13. The composition according to claim 1, wherein the structural unit represented by the Chemical Formula 1 comprises a structural unit represented by Chemical Formula 7, a structural unit represented by Chemical Formula 8, a structural unit represented by Chemical Formula 9, or a combination thereof;

the structural unit represented by the Chemical Formula 2 comprises a structural unit represented by Chemical Formula 10, a structural unit represented by Chemical Formula 11, a structural unit represented by Chemical Formula 12, or a combination thereof; and the structural unit represented by the Chemical Formula 3 comprises a structural unit represented by Chemical Formula 13, a structural unit represented by Chemical Formula 14, or a combination thereof:

Chemical Formula 7

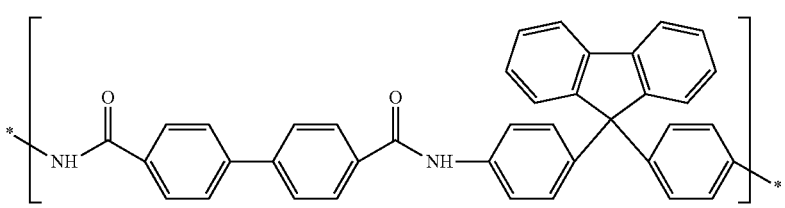

-continued
Chemical Formula 8
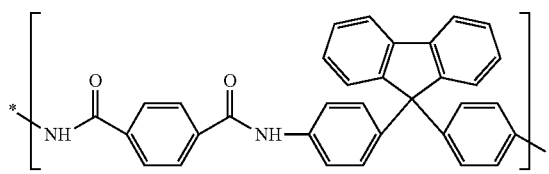
Chemical Formula 9
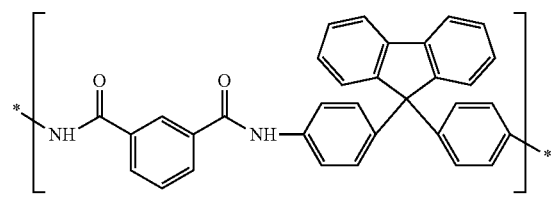
Chemical Formula 10
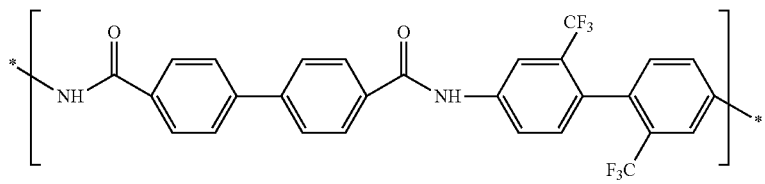
Chemical Formula 11
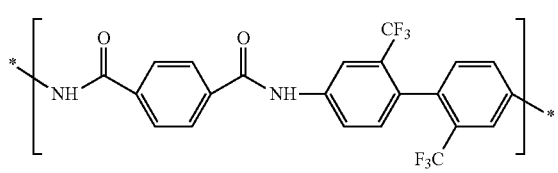
Chemical Formula 12
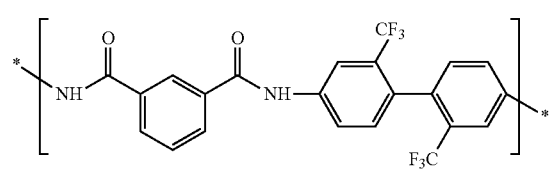
Chemical Formula 13
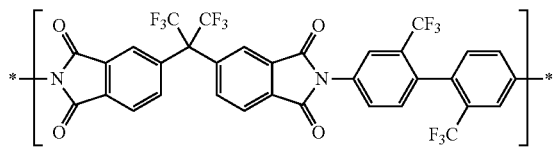
Chemical Formula 14
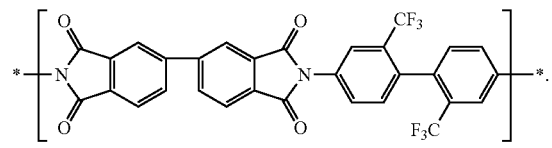
* * * * *